US012739157B2

(12) United States Patent
Sander et al.

(10) Patent No.: US 12,739,157 B2
(45) Date of Patent: Sep. 15, 2026

(54) APPROACHES FOR APSK MODULATION

(71) Applicant: Telefonaktiebolaget LM Ericsson (publ), Stockholm (SE)

(72) Inventors: Sverker Sander, Billdal (SE); Per Ingelhag, Alingsås (SE); Ulf Gustavsson, Gothenburg (SE); David Gustafsson, Sävedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/850,521

(22) PCT Filed: May 12, 2022

(86) PCT No.: PCT/EP2022/062867

§ 371 (c)(1),
(2) Date: Sep. 24, 2024

(87) PCT Pub. No.: WO2023/217369

PCT Pub. Date: Nov. 16, 2023

(65) Prior Publication Data

US 2025/0227011 A1 Jul. 10, 2025

(51) Int. Cl.
*H04L 27/00* (2006.01)
*H04L 27/36* (2006.01)

(52) U.S. Cl.
CPC .......... *H04L 27/0008* (2013.01); *H04L 27/36* (2013.01)

(58) Field of Classification Search
CPC ..... H04L 27/00; H04L 27/0008; H04L 27/10; H04L 27/14; H04L 27/156; H04L 27/32;
(Continued)

(56) References Cited

U.S. PATENT DOCUMENTS 5,623,511 A * 4/1997 Bar-David ............... H04B 1/69 370/213
6,055,266 A * 4/2000 Nakamura ............. H04B 1/707 375/140

(Continued)

FOREIGN PATENT DOCUMENTS

WO 2010074617 A1 7/2010

OTHER PUBLICATIONS

International Search Report and Written Opinion of the International Searching Authority, PCT/EP2022/062867, mailed Dec. 9, 2022, 15 pages.

(Continued)

*Primary Examiner* — James M Perez
(74) *Attorney, Agent, or Firm* — Sage Patent Group

(57) ABSTRACT

A method of providing a modulated signal for transmission is disclosed. The method includes selecting a modulation symbol, and operating a signal generator to provide the selected modulation symbol for transmission.
Each available modulation symbol has a symbol duration, includes a pulse, and indicates information by a combination of an amplitude of the pulse and a carrier phase of the pulse. A position of the pulse is defined within the symbol duration, and at least two of the available modulation symbols have different symbol durations.
The combination may further include the position of the pulse.
In some embodiments, the pulse represents an end of the available modulation symbol, and the pulse is preceded by a silent period.
A corresponding method of processing a received signal of modulation symbols is also disclosed; as well as corresponding computer program products, apparatuses, and communication devices.

18 Claims, 9 Drawing Sheets

(58) Field of Classification Search
CPC ......... H04L 27/34; H04L 27/36; H04L 25/02; H04L 25/03; H04L 25/03828; H04L 25/03834; H04L 25/38; H04L 25/40; H04L 25/49; H04L 25/4902; H04L 25/493; H04B 1/69; H04B 1/7163; H04B 1/717; H04B 1/7172; H04B 14/02; H04B 14/023; H04B 14/026
See application file for complete search history.

(56) References Cited

U.S. PATENT DOCUMENTS 7,512,188 B1* 3/2009 Watson ............... H04L 27/2003 375/279
7,613,262 B2* 11/2009 Wilhelmsson .......... H04L 27/18 375/355
8,081,882 B2* 12/2011 Tuchler ............... H04L 25/4902 398/189
8,766,607 B2* 7/2014 Sander ................... H02M 11/00 323/225
8,803,367 B2* 8/2014 Sander ..................... H03K 3/53 307/106
10,212,009 B2* 2/2019 Qu .......................... H04L 27/04
11,248,586 B2* 2/2022 Damgaard .............. H02J 3/381
2002/0061081 A1* 5/2002 Richards ................ H04B 1/719 375/E1.001
2003/0095609 A1* 5/2003 Cowie ................. H04L 25/4902 375/316
2003/0165184 A1* 9/2003 Welborn ............. H04L 25/4902 375/309
2004/0120424 A1* 6/2004 Roberts ............... H04L 27/0004 375/345
2004/0136439 A1* 7/2004 Dewberry ........... H04L 25/4902 375/130
2004/0161064 A1* 8/2004 Brethour ................ H04B 1/719 375/347
2004/0174924 A1* 9/2004 Lakkis ................. H04B 1/7174 375/130
2004/0261003 A1* 12/2004 Shen ..................... H04L 1/0041 714/792
2005/0013345 A1* 1/2005 Choi .................. H04B 1/71632 375/130
2005/0047480 A1* 3/2005 Carbonari ............ H04B 1/7174 375/295
2005/0089083 A1* 4/2005 Fisher .................. H04B 1/7075 375/130
2005/0276310 A1* 12/2005 Choi .................... H04B 1/7176 375/130
2006/0072684 A1* 4/2006 Feher ................ H04L 25/03834 375/308
2006/0140249 A1* 6/2006 Kohno ................. H04B 1/7172 375/130
2007/0211829 A1* 9/2007 Liang ................ H04L 25/03834 375/320
2008/0247442 A1* 10/2008 Orlik ....................... H04L 1/006 375/138
2008/0253349 A1* 10/2008 Yu ....................... H04L 27/2017 370/345
2009/0322587 A1* 12/2009 Stayton ................... H04L 27/26 342/37
2011/0188603 A1* 8/2011 Dowling ........... H04L 25/03834 375/300
2011/0254594 A1* 10/2011 Sander ..................... H03K 3/86 327/108
2012/0283987 A1* 11/2012 Busking .................. G01S 13/82 702/159
2014/0072063 A1* 3/2014 Hansen .................... H03K 7/04 375/265
2018/0227154 A1* 8/2018 Glattli ..................... H04L 27/32
2025/0125899 A1* 4/2025 Kuriyama ............. H04L 1/0003
2025/0227011 A1* 7/2025 Sander ................ H04L 25/4902

OTHER PUBLICATIONS

Sethakaset, U. et al., “Differential Amplitude Pulse-Position Modulation for Indoor Wireless Optical Channels,” Global Telecommunications Conference, 2004 (Globecom ’04), IEEE, Nov. 29-Dec. 3, 2004, Dallas, Texas, USA, 5 pages
Sander, Sverker, “Buck and Boost Converters With Transmission Lines, ” IEEE Transactions on Power Electronics, vol. 27, No. 9, Sep. 2012, 8 pages.

* cited by examiner

APPROACHES FOR APSK MODULATION

CROSS REFERENCE TO RELATED APPLICATIONS

This application is a 35 U.S.C. § 371 national stage application of PCT International Application No. PCT/EP2022/062867 filed on May 12, 2022, the disclosure and content of which is incorporated by reference herein in its entirety.

TECHNICAL FIELD

The present disclosure relates generally to the field of wireless, or wired, communication. More particularly, it relates to communication approaches that applies amplitude-phase shift keying (APSK).

BACKGROUND

In the field of communication, modulation of a carrier signal (i.e., a radio frequency signal) is commonly applied. Some example modulation approaches involve indicating information to be modulated via variations in the amplitude of the carrier signal, via variations in the phase of the carrier signal, or via a combination thereof (a.k.a., amplitude-phase shift keying, APSK).

Numerous types of signal generators may be used for providing modulated carriers. For example, WO 2010/074617 A1 describes an electrical power conversion device that is usable for generation of four modulated symbols: a first symbol with amplitude 1 and phase 0 degrees, a second symbol with amplitude 1 and phase 180 degrees, a third symbol with amplitude 2 and phase 0 degrees, and a fourth symbol with amplitude 2 and phase 180 degrees.

However, some types of signal generators may suffer from hardware limitations that constitute obstacles to application of APSK for modulation. For example, hardware limitations may negatively impact one or more of: the efficiency of signal generation, the information throughput, the error probability of demodulation, and the transmission power.

Therefore, there is a need for alternative approaches to signal generation in relation to APSK.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method of providing a modulated signal for transmission. The method comprises selecting a modulation symbol from a collection of available modulation symbols for representation of a block of information to be modulated, and operating a signal generator to provide the selected modulation symbol for transmission. Each available modulation symbol has a symbol duration, comprises a pulse, and indicates the information by a combination of an amplitude of the pulse and a carrier phase of the pulse. A position of the pulse is defined within the symbol duration of the available modulation symbol, and at least two of the available modulation symbols have different symbol durations.

In some embodiments, the combination by which each available modulation symbol indicates the information further comprises the position of the pulse.

In some embodiments, the pulse of an available modulation symbol represents an end of the available modulation symbol, and the pulse is preceded by a silent period.

In some embodiments, the method further comprises setting a reference point in time for a current block of information to be modulated, wherein the reference point in time is related to an end of pulse of a previous modulation symbol, and wherein selecting a modulation symbol for representation of the current block of information to be modulated comprises specifying the pulse position in relation to the reference point in time for the current block of information.

In some embodiments, the position of the pulse is selected from a set of available pulse positions, and/or wherein the amplitude is selected from a set of available amplitudes.

In some embodiments, the set of available pulse positions comprises a first available pulse position starting one pulse duration interval after an end of a previous pulse, a last available pulse position starting a maximum integer multiple of pulse duration intervals after the end of the previous pulse, and any one or more intermediate available pulse positions, each starting a respective integer multiple of pulse duration intervals after the end of the previous pulse, wherein the respective integer is larger than one and smaller than the maximum integer.

In some embodiments, each available pulse position is associated with a respective subset of the set of available amplitudes.

For a particular available pulse position starting a number of pulse duration intervals after the end of the previous pulse, a cardinality of the respective subset corresponds to the number of pulse durations according to some embodiments.

In some embodiments, the set of available amplitudes comprises a base amplitude and one or more integer multiples of the base amplitude.

In some embodiments, each available amplitude is associated with a respective set of available carrier phases.

For a particular available amplitude which is a particular integer multiple, N, of the base amplitude, a cardinality of the respective set of available carrier phases is lower than, or equal to, $\pi/\sin^{-1}(\frac{1}{2}N)$ according to some embodiments.

In some embodiments, operating the signal generator comprises triggering a start of a loading period of the signal generator within the symbol duration and prior to a start of the position of the pulse, wherein the loading period ends at the start of the position of the pulse and has a length that corresponds to the amplitude of the pulse.

In some embodiments, the signal generator comprises an amplitude controller, a carrier phase controller, a pulse position controller, and a transmission line. Then, operating the signal generator may comprise activating the amplitude controller to accumulate energy on the transmission line, wherein the energy relates to the amplitude of the pulse;

after accumulation of the energy, repeatedly activating the carrier phase controller to provide mixing of the amplitude with a carrier frequency, wherein a periodicity of the repeated activation is based on the carrier frequency and a timing of the repeated activation corresponds to the carrier phase of the pulse; and activating the pulse position controller to release energy for the pulse, wherein a timing of the release corresponds to the position of the pulse.

A second aspect is a method of processing a received signal of modulation symbols, wherein each modulation symbol belongs to a collection of available modulation symbols, has a symbol duration, comprises a pulse, and indicates information by a combination of an amplitude of the pulse and a carrier phase of the pulse. A position of the pulse is defined within the symbol duration of the available modulation symbol, and at least two of the available modulation symbols have different symbol durations. The method comprises asynchronously triggering execution of a demodulation stage responsive to reception of a pulse.

In some embodiments, the combination by which each available modulation symbol indicates the information further comprises the position of the pulse, and metrics used by the demodulation stage are based on the position of the pulse.

In some embodiments, the position of the pulse is determined in relation to an end of a previous pulse.

In some embodiments, the method further comprises, responsive to absence of pulse reception for a maximum integer multiple of pulse duration intervals after the end of the previous pulse, triggering execution of a dummy demodulation stage.

In some embodiments, the method further comprises, responsive to reception of a first pulse after the dummy modulation stage, disregarding any information carried by the position of the first pulse.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for providing a modulated signal for transmission. The apparatus comprises controlling circuitry configured to cause selection of a modulation symbol from a collection of available modulation symbols for representation of a block of information to be modulated, and operation of a signal generator to provide the selected modulation symbol for transmission. Each available modulation symbol has a symbol duration, comprises a pulse, and indicates the information by a combination of an amplitude of the pulse and a carrier phase of the pulse. A position of the pulse is defined within the symbol duration of the available modulation symbol, and at least two of the available modulation symbols have different symbol durations.

A fifth aspect is an apparatus for processing a received signal of modulation symbols, wherein each modulation symbol belongs to a collection of available modulation symbols, has a symbol duration, comprises a pulse, and indicates information by a combination of an amplitude of the pulse and a carrier phase of the pulse. A position of the pulse is defined within the symbol duration of the available modulation symbol, and at least two of the available modulation symbols have different symbol durations. The apparatus comprises controlling circuitry configured to cause asynchronous triggering of execution of a demodulation stage responsive to reception of a pulse.

A sixth aspect is a communication device comprising the apparatus of the fourth aspect and/or the apparatus of the fifth aspect.

In some embodiments, any of the above aspects may additionally have features identical with or corresponding to any of the various features as explained above for any of the other aspects.

An advantage of some embodiments is that alternative approaches are provided for APSK signal generation.

An advantage of some embodiments is that signal generators with hardware limitations (e.g., a radio frequency power amplifier, RFPA, such as the electrical power conversion device described in WO 2010/074617 A1) can be used for APSK for modulation.

An advantage of some embodiments is that negative impact resulting from hardware limitations is mitigated for one or more of: the efficiency of signal generation, the information throughput, the error probability of demodulation, and the transmission power.

For example, some embodiments provide approaches that-compared to approaches of the prior art-increases information throughput, and/or lowers error probability of demodulation, and/or lowers required transmission power.

Alternatively or additionally, some embodiments provide approaches that enable use of signal generators with hardware limitations (e.g., the electrical power conversion device described in WO 2010/074617 A1) while negative impact resulting from the hardware limitations (e.g., decreased information throughput, and/or increased error probability of demodulation, and/or increased required transmission power) is kept at a relatively low level.

Thus, some embodiments enable increase of information throughput for signal generators with hardware limitations. For example, some signal generators (e.g., the electrical power conversion device described in WO 2010/074617 A1) have hardware limitations that prohibits output of a continuous radio frequency (RF) signal, which may be limiting for the throughput. This problem is mitigated by some embodiments.

Furthermore, some embodiments enable use of the electrical power conversion device described in WO 2010/074617 A1 for signal generation, which may entail relatively high RFPA efficiency, and/or relatively low radio system losses, and/or relatively low transmission power.

Generally, it should be noted that various embodiments might not entail all of the above-mentioned advantages. For example, some embodiments may entail a relatively high transmission power.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, it should be noted that the term "switch" when used herein is meant to refer to any suitable technology/circuitry for causing a functional closing/opening of signal path.

In the following, some embodiments will be described that are suitable for signal generation in relation to APSK. It should be noted that, even though some embodiments may be particularly beneficial in the context of signal generators with hardware limitations (e.g., the electrical power conversion device described in WO 2010/074617 A1), application is not limited to such situations. Contrarily, the approaches for APSK signal generation according to some embodiments are equally applicable in any suitable signal generation context.

Figure 1:
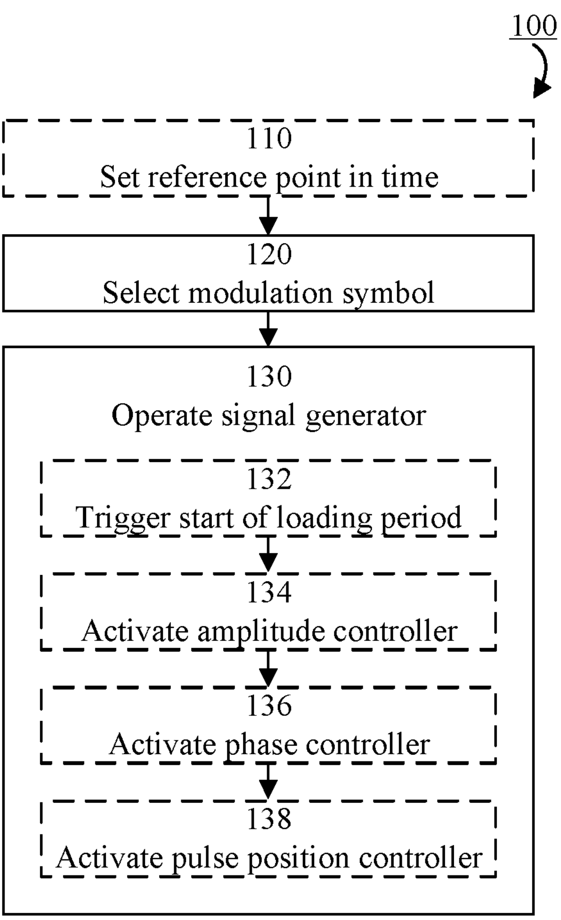
FIG. 1 is a flowchart illustrating example method steps according to some embodiments.

FIG. 1 illustrates an example method 100 according to some embodiments. The method 100 is a method of providing a modulated signal for transmission. For example, the method 100 may be performed by a transmitter (e.g., a transmitter of a communication device).

The method 100 comprises selecting a modulation symbol from a collection of available modulation symbols for representation of a block of information to be modulated, as illustrated by step 120, and operating a signal generator to provide the selected modulation symbol for transmission, as illustrated by step 130.

Each available modulation symbol has a symbol duration, and at least two of the available modulation symbols have different symbol durations.

Furthermore, each available modulation symbol comprises a pulse (e.g., a pulse of a modulated carrier signal), and indicates the information to be modulated by a combination of an amplitude of the pulse and a carrier phase of the pulse. Thus, the available modulation symbols may be seen as APSK symbols. The pulse duration may be fixed or variable.

A position of the pulse is defined within the symbol duration of the available modulation symbol. In some embodiments, the combination by which each available modulation symbol indicates the information further comprises the position of the pulse. Thus, the available modulation symbols in such embodiments may be seem as APSK symbols with pulse position modulation. As elaborated on herein, some embodiments provide APSK symbols with pulse position modulation, wherein there is a dependency between the pulse position and the amplitude.

In some embodiments, the symbol duration of an available modulation symbol is defined by the position of the pulse (i.e., the position of the pulse is different for available modulation symbols with different symbol durations). For example, a beginning of the symbol duration of a current modulation symbol may correspond to an end of the pulse of a directly previous modulation symbol, and/or an end of the symbol duration of a modulation symbol may correspond to an end of the pulse of the modulation symbol. Thus, the pulse of an available modulation symbol may represent an end of the available modulation symbol.

According to some embodiments, the method 100 comprises setting a reference point in time for a current block of information to be modulated (i.e., for a current modulation symbol), as illustrated by optional step 110. The reference point in time is related to a previous modulation symbol (e.g., the directly previous modulation symbol). Thus, the reference point may be seen as set dynamically based on the varying symbol duration of the modulation symbols. For example, the reference point in time may be related to (e.g., correspond to) an end of pulse of the previous modulation symbol. When the reference point approach is used, step 120 may comprise specifying the pulse position of a current modulation symbol in relation to the reference point in time for the current block of information.

In some embodiments, the pulse of an available modulation symbol is preceded by a silent period. The silent period may be of varying length to cause different symbol durations.

Alternatively or additionally, the silent period may be configured to accommodate a loading period of the signal generator (e.g., when the signal generator comprises the electrical power conversion device described in WO 2010/074617 A1).

Generally, it should be noted that the term "loading" as used herein in relation to the signal generator, could be exchanged by the term "charging"; as suitable.

For example, the loading period may be configured for accumulation of energy to be released as the pulse. Typically, the loading period may have a length that corresponds to the amplitude of the pulse. Thus, when a first modulation symbol has higher amplitude than a second modulation symbol, the first modulation symbol typically has a longer loading period than the second modulation symbol.

The length of the loading period provides a minimum possible symbol duration according to some embodiments. Thus, according to some embodiments, there may not be any available modulation symbols with relatively high amplitude and relatively short symbol duration.

The length of the loading period may be equal to the length of the silent period, or may be shorter than the length of the silent period. In the latter case, the loading period is typically arranged towards the end of the silent period (e.g., the loading period may end at the start of the position of the pulse) and is preceded by an idle period of the signal generator.

When a loading period for the signal generator is applied, step 130 may comprise triggering a start of a loading period of the signal generator within the symbol duration and prior to a start of the position of the pulse, as illustrated by optional substep 132.

As will be exemplified in the following, the signal generator may comprise an amplitude controller, a carrier phase controller, a pulse position controller, and a transmission line (e.g., corresponding to the electrical power conversion device described in WO 2010/074617 A1).

To this end, step 130 may comprise activating the amplitude controller to accumulate energy (relating to the amplitude of the pulse) on the transmission line, as illustrated by optional substep 134. In some embodiments, substep 134 may be executed responsive to substep 132, as exemplified in FIG. 1. Alternatively, substep 134 may be seen as one possible implementation of triggering a start of a loading period.

After accumulation of the energy, step 130 may comprise repeatedly activating the carrier phase controller (as illustrated by optional substep 136) to provide mixing of the amplitude with a carrier frequency. The periodicity of the repeated activation is based on the carrier frequency (i.e., the periodicity of the repeated activation is equal to the periodicity of the carrier; which is proportional to the inverse of the carrier frequency), and the timing of the repeated activation corresponds to the carrier phase.

Step 130 may also comprise activating the pulse position controller to release energy for the pulse, as illustrated by optional substep 138. The timing of the release corresponds to the position of the pulse.

Even though not shown in FIG. 1, the method 100 may further comprise transmitting the selected modulation symbol(s) after they have been provided as a result of execution of step 130.

Figures 2A, 2B:
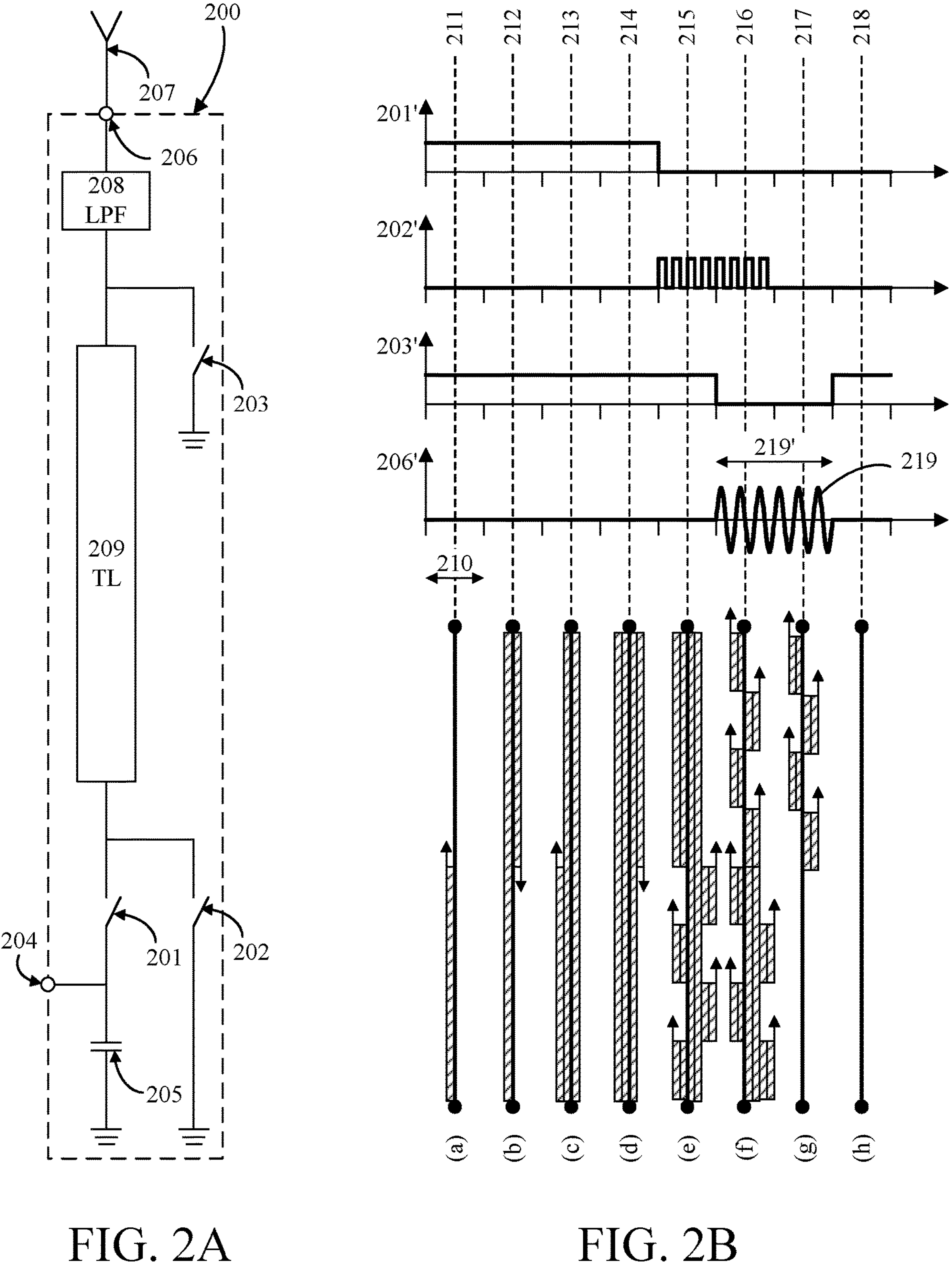
FIG. 2A is a schematic circuit diagram illustrating an example signal generator according to some embodiments.
FIG. 2B is a collection of plots illustrating example signal generator operation according to some embodiments.

FIG. 2A and FIG. 2B schematically illustrate an example signal generator 200 (compare with the electrical power conversion device described in WO 2010/074617 A1) and corresponding operation according to some embodiments. For example, the signal generator 200 may be used for execution of step 130 of FIG. 1.

The signal generator 200 comprises a transmission line (TL) 209. For example, the transmission line 209 may be implemented having an impedance $Z_0$ (e.g., a low frequency inductive impedance). Generally, the low frequency impedance of the transmission line may be referred to as L' or L prime.

The transmission line 209 is connected at a first end to a first switch (S1) 201, and to a second switch (S2) 202. The first and second switches 201, 202 may be arranged as shown in FIG. 2A.

The first switch 201 is configured, when closed, to connect the first end of the transmission line 209 to a first reference voltage 204 (e.g., an input voltage, $V_{IN\_DC}$).

Optionally, a capacitance 205 may be arranged between ground (or another suitable reference voltage) and a connection point between the first switch 201 and the first reference voltage 204. The capacitance 205 may be configured to accumulate energy from the first reference voltage 204 when the first switch is open, and to release energy to the transmission line 209 when the first switch is closed.

The second switch 202 is configured, when closed, to connect the first end of the transmission line 209 to a second reference voltage (e.g., ground).

The transmission line 209 is connected at a second end to a third switch (S3) 203, and to an antenna signal path.

The third switch 203 is configured, when closed, to connect the second end of the transmission line 209 to a third reference voltage 204 (e.g., ground).

The antenna signal path is connected to an antenna port 206, to which an antenna arrangement 207 may be connected. Optionally, the antenna signal path comprises a filter (e.g., a low pass filter, LPF) 208, which is configured to block some frequency components of the signal from being transmitted by the antenna arrangement 207.

According to some embodiments, the first switch may be used as an amplitude controller, the second switch may be used as a carrier phase controller, and the third switch may be used as a pulse position controller.

FIG. 2B illustrates example operation of the signal generator 200 of FIG. 2A to produce a pulse 219 with duration 219'.

The operation is shown via four interrelated timing diagrams: 201' showing operations (ON/OFF) of the first switch 201, 202' showing operations (ON/OFF) of the second switch 202, 203' showing operations (ON/OFF) of the third switch 203, and 206' showing the resulting signal at the antenna port 206.

Generally, a switch being closed may correspond to an ON-state of the switch, and a switch being open may correspond to an OFF-state of the switch.

FIG. 2B also shows eight representations (a)-(h) of the energy distribution on the transmission line at different points in time 211-218.

The timing diagrams and the pulse duration 219' are represented in relation to a time grid with a resolution 210 that corresponds to the delay $t_d$ associated with the transmission line 209.

At the start of the timing diagrams, the first switch 201 is turned ON (compare with substep 134 of FIG. 1), while the second switch 202 is OFF, and the third switch 203 is ON (such that there is no signal at the antenna port 206).

While the first switch 201 is ON, the energy is accumulated on the transmission line, as illustrated for times 211-214 by representations (a)-(d) of the energy distribution on the transmission line. The accumulation of energy corresponds to a loading period, and is continued until the amplitude of the pulse can be provided. In FIG. 2B, the loading period has a duration that corresponds to two pulse durations 219'.

When the amplitude of the pulse can be provided, the first switch 201 is turned OFF, while the third switch 203 remains ON, and the second switch 202 is toggled between ON and OFF (compare with substep 136 of FIG. 1).

While the second switch 202 is toggled between ON and OFF, the amplitude is mixed, as illustrated for times 215-216 by representations (e)-(f) of the energy distribution on the transmission line. The toggling rate (i.e., the periodicity of repeated activation) is based on the carrier frequency of the mixing, and time shifting of the toggling controls the carrier phase. In FIG. 2B, the mixing period has a duration that corresponds to one pulse duration 219'.

When the mixed energy reaches the second end of the transmission line 209 (which typically occurs when the toggling has been ongoing during the delay $t_d$ associated with the transmission line), the third switch 203 is turned OFF (compare with substep 138 of FIG. 1), while the first switch 201 remains OFF, and the toggling of the second switch 202 continues.

While the third switch 203 is OFF, the second end of the transmission line 209 is connected to the antenna port 206 and releases the energy of the pulse 219 for transmission, as illustrated for times 216-217 by representations (f)-(g) of the energy distribution on the transmission line. The timing of the OFF period of the third switch 203 corresponds to the position of the pulse 219.

When the pulse 219 has been generated, the third switch 203 is turned ON and the second switch 202 is already OFF. Then, a new loading period may be initiated by turning the first switch 201 ON, or an idle period of the signal generator may begin by letting the third switch 203 remain OFF. The latter is illustrated for time 218 by representation (e), showing that there is no energy on the transmission line.

In some embodiments, the pulse duration 219' is proportional to the propagation time of the transmission line 209.

Thus, according to some embodiments, the signal generator 200 is configured to convert an input direct current (DC) voltage 204, by accumulation of a voltage wave on the transmission line 209 (*a*)-(*d*), followed by radio frequency (RF) carrier phase modulation of the wave on the transmission line 209 (*e*)-(*g*), to produce a compound signal 219 that is passed to an antenna 207. The voltage amplitude of the provided pulse 219 may be restricted to be an integer multiple N of the input DC voltage 204.

The transmission line 209 has a propagation time $t_d$; the delay associated with the transmission line (compare with 210). One accumulation lap of the loading period (corresponding to the base amplitude) has a duration of 2*ta* and correspond to N=1, thus producing an output pulse 219 with amplitude $V_{out}=V_{IN\_DC}$. Two accumulation laps (corresponding to the twice the base amplitude) have a duration of $4t=_d$ and correspond to N=2, thus producing an output pulse 219 with amplitude $V_{out}=2V_{IN\_DC}$. Generally, a number of accumulation laps (corresponding to an integer number scaling of the base amplitude) that correspond to N produce an output pulse 219 with amplitude $V_{out}=NV_{IN\_DC}$.

In the reminder of this disclosure, the delay (typically corresponding to $t_d$) between the end of the loading period (e.g., turning OFF the first switch and/or starting toggling of the second switch) and the start of the pulse (e.g., turning OFF the third switch) will be mostly ignored for ease of description. Thus, exemplification will largely be presented as if the loading period ends simultaneously as the pulse starts. It should be noted, however, that practical implementations typically need to account for a delay between the end of the loading period and the start of the pulse, as illustrated by FIG. 2B.

One benefit of using a transmission line signal generator is that the maximum theoretical efficiency, from input DC voltage to output modulated RF carrier, may be constant (e.g., 81%) and independent of the load voltage (i.e., the amplitude of the output modulated RF carrier).

One benefit of using a transmission line signal generator is that the signal generator can have a very simple hardware architecture. For example, the signal generator may be controlled to perform amplitude modulation, pulse position modulation, frequency up-conversion, and carrier phase modulation based on only three semiconductors (S1, S2, S3).

One benefit of using a transmission line signal generator is that power scaling may easily be implemented by using a varying number of HW phases for loading and sending, thus distributing power between a varying number of components.

Figures 2C, 2D:
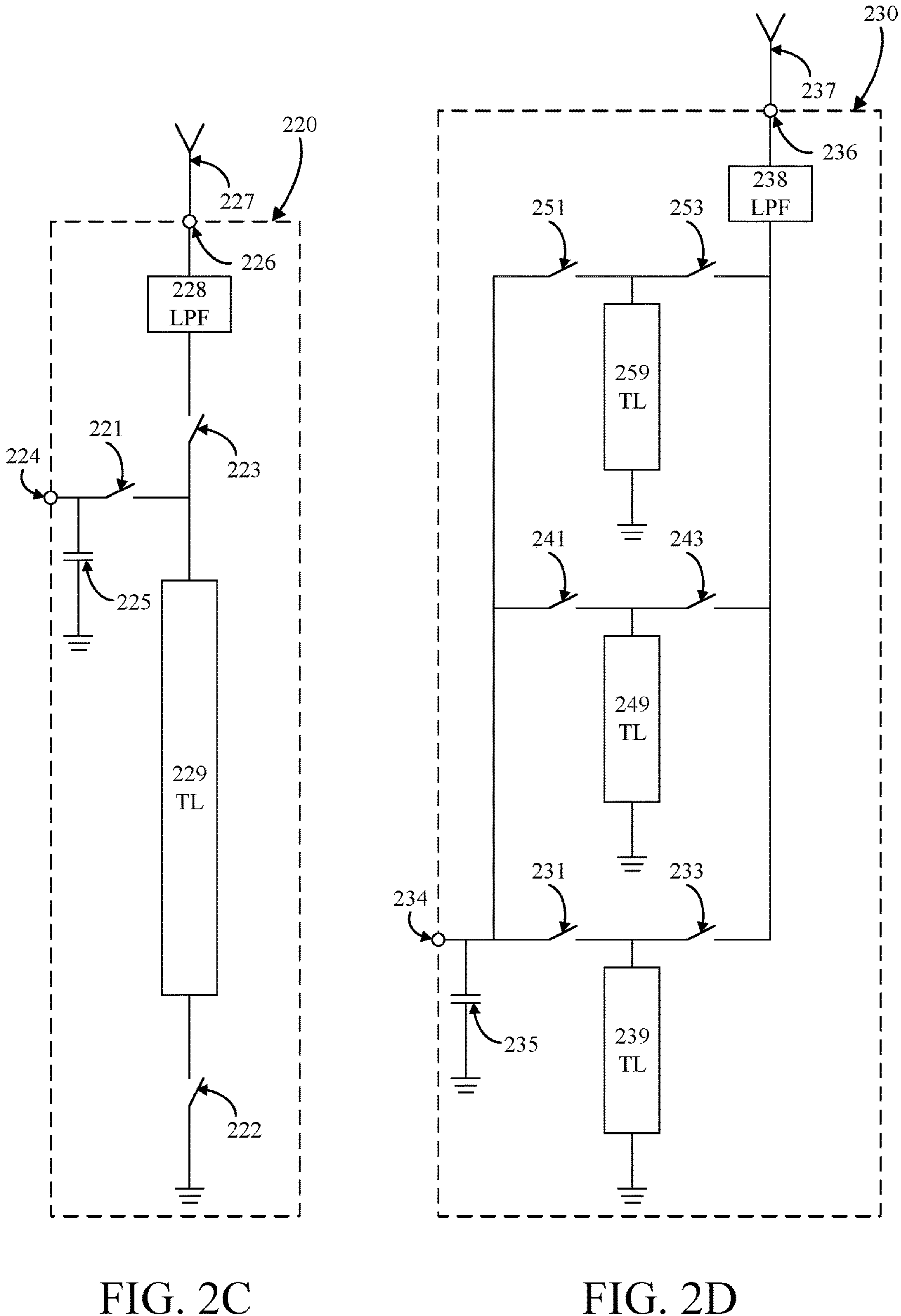
FIG. 2C is a schematic circuit diagram illustrating an example signal generator according to some embodiments.
FIG. 2D is a schematic circuit diagram illustrating an example signal generator according to some embodiments.

FIG. 2C schematically illustrates an example signal generator 220 according to some embodiments. The signal generator 220 may be seen as an alternative to the signal generator 200 of FIG. 2A. For example, the signal generator 220 may be used for execution of step 130 of FIG. 1.

The signal generator 220 comprises a transmission line (TL) 229. For example, the transmission line 229 may be implemented having an impedance $Z_0$ (compare with 209 of FIG. 2A).

The transmission line 229 is connected at a first end to a first switch (S1) 221, and to a third switch (S3) 223.

The first switch 221 is configured, when closed, to connect the first end of the transmission line 229 to a first reference voltage 224 (e.g., an input voltage, $V_{IN\_DC}$).

Optionally, a capacitance 225 may be arranged between ground (or another suitable reference voltage) and a connection point between the first switch 221 and the first reference voltage 224. The capacitance 225 may be configured to accumulate energy from the first reference voltage 224 when the first switch is open, and to release energy to the transmission line 229 when the first switch is closed.

The third switch 223 is configured, when closed, to connect the first end of the transmission line 229 to an antenna signal path. The antenna signal path is connected to an antenna port 226, to which an antenna arrangement 227 may be connected. Optionally, the antenna signal path comprises a filter (e.g., a low pass filter, LPF) 228, which is configured to block some frequency components of the signal from being transmitted by the antenna arrangement 227.

The transmission line 229 is connected at a second end to a second switch (S2) 222. The second switch 222 is configured, when closed, to connect the second end of the transmission line 229 to a second reference voltage (e.g., ground).

According to some embodiments, the first switch may be used as an amplitude controller, the second switch may be used as a carrier phase controller, and the third switch may be used as a pulse position controller.

For example, the signal generator 220 may be operated in a similar way as the operation described in FIG. 2B for the signal generator 200 of FIG. 2A; with suitable adjustments (e.g., the third switch 223 is OFF when the third switch 203 is ON, and is ON when the third switch 203 is OFF).

FIG. 2D schematically illustrates an example signal generator 230 according to some embodiments. For example, the signal generator 230 may be used for execution of step 130 of FIG. 1.

The signal generator 230 comprises a plurality of transmission lines (TL) 239, 249, 259 (compare with 229 of FIG. 2C). In FIG. 2D, there are three transmission lines, but this is not intended as limiting. Contrarily, the number of transmission lines may be any integer larger than one.

Each transmission line 239, 249, 259 is connected at a first end to a respective first switch (S1) 231, 241, 251 (compare with 221 of FIG. 2C), and to a third switch (S3) 233, 243, 253 (compare with 223 of FIG. 2C).

Each of the first switches 231, 241, 251 is configured, when closed, to connect the first end of the respective transmission line 239, 249, 259 to a first reference voltage 234 (e.g., an input voltage, $V_{IN\_DC}$; compare with 224 of FIG. 2C).

Optionally, a capacitance 235 (compare with 225 of FIG. 2C) may be arranged between ground (or another suitable reference voltage) and a connection point between the first switches 231, 241, 251 and the first reference voltage 234.

Each of the third switches 233, 243, 253 is configured, when closed, to connect the first end of the respective transmission line 239, 249, 259 to an antenna signal path. The antenna signal path is connected to an antenna port 236 (compare with 226 of FIG. 2C), to which an antenna arrangement 237 may be connected. Optionally, the antenna signal path comprises a filter (e.g., a low pass filter, LPF) 238 (compare with 228 of FIG. 2C), which is configured to block some frequency components of the signal from being transmitted by the antenna arrangement 237.

Although not shown in FIG. 2D, each transmission line 239, 249, 259 may be connected at a second end to a second switch (S2; compare with 222 of FIG. 2C). The second switch is configured, when closed, to connect the second end of the respective transmission line 239, 249, 259 to a second reference voltage (e.g., ground).

According to some embodiments, each of the transmission lines may be used for signal generation where the corresponding first switch may be used as an amplitude controller, the corresponding second switch (not shown in FIG. 2D) may be used as a carrier phase controller, and the corresponding third switch may be used as a pulse position controller.

An advantage of the signal generator 230 is that the operation of the different transmission lines 239, 249, 259 may be configured (using timing of the switches) such that a pulse is released from a single one of the transmission lines 239, 249, 259 at a time. Thereby, any silent period associated with one of the transmission lines may comprise pulse(s) from other transmission line(s). Thus, throughput may be increased compared to when a single transmission line is used (e.g., as in FIG. 2C).

When more output pulses are provided per time unit for the signal generator 230 than for signal generator 220, the average output power will be higher for signal generator 230 than for signal generator 220 if the input voltage 224, 234 is the same. This may be utilized as an advantage in itself, or may be transformed (by decreasing the input voltage 234 in relation to the input voltage 224) into relaxed requirements for the switch component(s).

By studying the example of FIG. 2B, some constraints may be formulated for the signal generator 200 of FIG. 2A. Firstly, two pulses cannot be adjacent, as will be visualized by (a) in FIG. 3; i.e., there must be a void (silent period) between pulses, regardless of the pulse amplitude. Secondly, the length of the void needs to increase with increased pulse amplitude, as will be visualized by (c) and (e) in FIG. 3.

These constraints may be suitably navigated by application of the approaches described herein.

Figure 3:
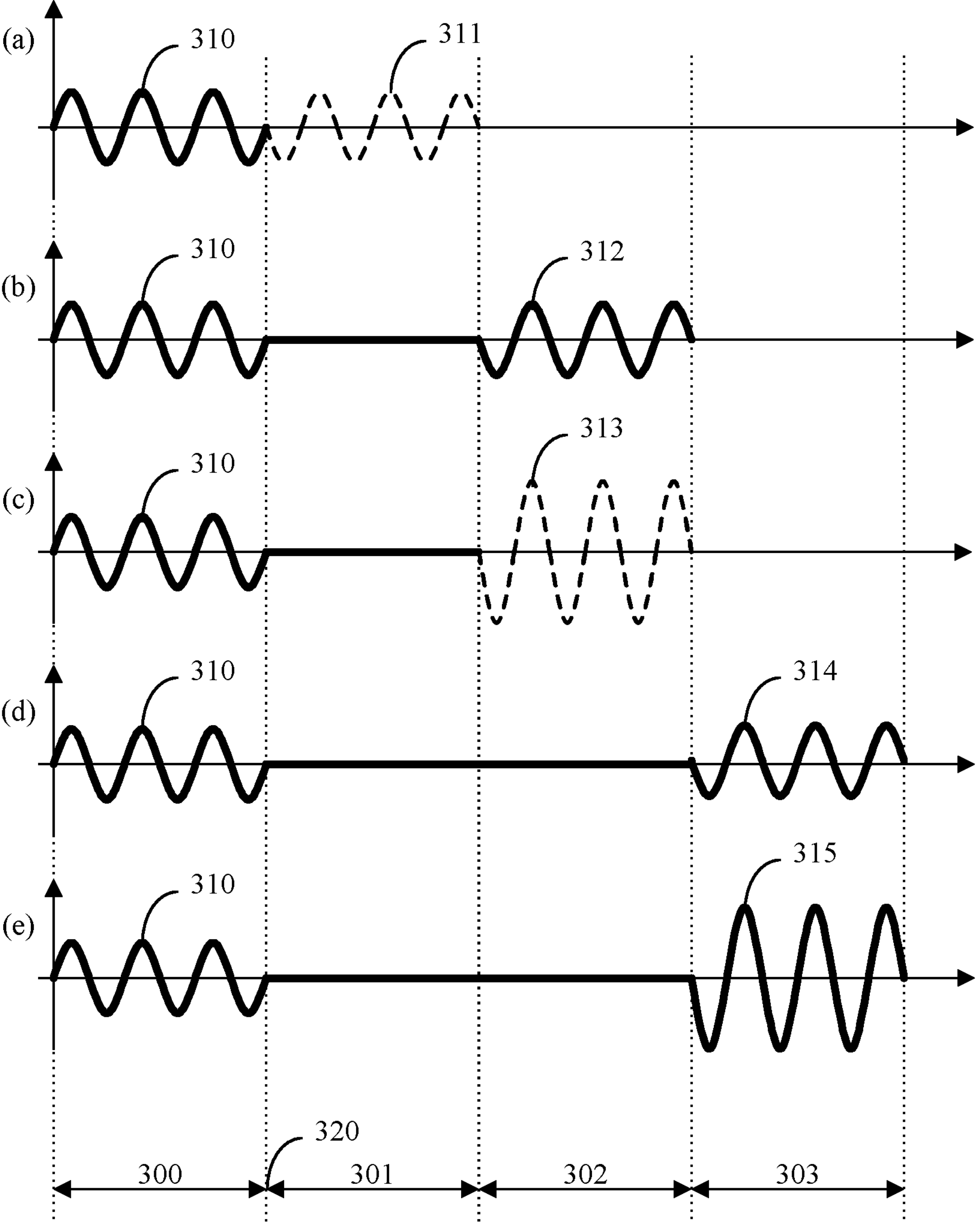
FIG. 3 is a collection of plots illustrating example modulated signals according to some embodiments.

FIG. 3 is a collection of time domain plots (a)-(e) illustrating example modulated signals according to some embodiments. The plots are represented in relation to a time grid with a resolution that corresponds to a pulse duration interval 300, 301, 302, 303.

For example, the modulated signals illustrated in FIG. 3 may be generated by any of the signal generators 200 of FIG. 2A and 220 of FIG. 2C. Alternatively or additionally, the modulated signals illustrated in FIG. 3 may be a result of execution of the method 100 of FIG. 1.

A reference point in time 320 is set for a current modulation symbol. The reference point in time 320 is related to the directly previous modulation symbol by corresponding to the end of the pulse 310 of the directly previous modulation symbol.

The pulse position for the current modulation symbol may be specified in relation to the reference point in time 320.

Assuming that a signal generator with a single transmission line is used (e.g., 200 of FIG. 2A or 220 of FIG. 2C), it is not possible to provide a pulse for transmission directly after the pulse 310 of the previous modulation symbol. Thus, if the pulse 310 of the directly previous modulation symbol was transmitted in pulse duration interval 300, the directly subsequent pulse duration interval 301 represents a non-available pulse position. This is illustrated in plot (a) by a dashed "impossible" pulse 311.

However, when at least one pulse duration interval has been made available for loading after the pulse 310 of the previous modulation symbol, it is possible to provide a pulse for transmission. Thus, the pulse duration interval 302 represents an available pulse position if the pulse duration interval 301 is available for loading. This is illustrated in plot (b) by a "possible" pulse 312 (here; with a 180 degree phase shift compared to the pulse 310). This pulse position may be specified as starting one pulse duration interval after the reference point in time 320.

It should be noted that the loading can typically be shifted to start $t_d$ before the end of the pulse 310 of the previous symbol (compare with FIG. 2B). As mentioned earlier, this is mostly ignored in the elaborations herein for ease of description.

It should be noted that the number of pulse duration intervals that have been made available for loading after the pulse 310 of the previous modulation symbol may entail limitations on which amplitudes are possible to produce for the pulse. Thus, if a single pulse duration interval 301 is available for loading, it may not be possible to provide a pulse with relatively high amplitude in pulse duration interval 302. This is illustrated in plot (c) by a dashed "impossible" high-amplitude pulse 313.

With increasing number of pulse duration intervals made available for loading after the pulse 310 of the previous modulation symbol, the set of available amplitudes also increases. Thus, for the available pulse duration interval 303, a pulse with relatively low amplitude may be produced (loading only during pulse duration interval 302, idle during pulse duration interval 301) or a pulse with relatively high amplitude may be produced (loading during both 301 and 302). This is illustrated in plot (d) by a "possible" low-amplitude pulse 314, and in plot (e) by a "possible" high-amplitude pulse 315 (both with a 180 degree phase shift compared to the pulse 310). This pulse position may be specified as starting two pulse duration intervals after the reference point in time 320.

The example of FIG. 3 may be used to illustrate that the length of the loading period may provide a minimum possible symbol duration. For example, when the relatively high amplitude of pulse 315 is to be used, it may be required to have at least two pulse duration intervals available for loading, so that the minimum possible symbol duration is three pulse duration intervals.

Putting the example modulated signals of FIG. 3 in the context of the method 100 of FIG. 1, the collection of available modulation symbols (compare with step 120 of FIG. 1) may comprise first, second, and third available modulation symbols (e.g., APSK symbols with pulse position modulation, with dependency between the pulse position and the amplitude).

The first available modulation symbol could comprise (e.g., consist of) a silent period with the length of a single pulse duration interval 301 followed by a pulse 312 with comparatively low amplitude. The second available modulation symbol could comprise (e.g., consist of) a silent period with the length of two pulse duration intervals 301, 302 followed by a pulse 314 with comparatively low amplitude. The third available modulation symbol could comprise (e.g., consist of) a silent period with the length of two pulse duration intervals 301, 302 followed by a pulse 315 with comparatively high amplitude.

The variable length of the silent period may cause different symbol durations. For example, the first available modulation symbol has a duration of two pulse duration intervals 301, 302, while the second and third available modulation symbols each has a duration of three pulse duration intervals 301, 302, 303.

As exemplified by the collection of available modulation symbols of FIG. 3, the information to be modulated may be represented by a combination of amplitude, carrier phase, and pulse position. Assuming that two different carrier phases are available, the number of available modulation symbols as exemplified in FIG. 3 could be six (the three available modulation symbols shown in FIG. 3 and three corresponding available modulation symbols with a 180 degree phase shift).

One way of visualizing the available amplitudes and pulse positions represented by (b), (d) and (e) in FIG. 3 is provided by the following table.

| | Interval 1 (e.g., 301) | Interval 2 (e.g., 302) | Interval 3 (e.g., 303) |
|---|---|---|---|
| (b) | Loading | Pulse, amplitude 1 | — |
| (d) | Idle | Loading | Pulse, amplitude 1 |
| (e) | Loading | Loading | Pulse, amplitude 2 |

If the modulation symbols are allowed to have a duration corresponding to four pulse duration in intervals, the following table could be used for visualization, where each row represents an available combination of amplitude and pulse position.

| Interval 1 | Interval 2 | Interval 3 | Interval 4 |
|---|---|---|---|
| Loading | Pulse, amplitude 1 | — | — |
| Idle | Loading | Pulse, amplitude 1 | — |
| Loading | Loading | Pulse, amplitude 2 | — |
| Idle | Idle | Loading | Pulse, amplitude 1 |
| Idle | Loading | Loading | Pulse, amplitude 2 |
| Loading | Loading | Loading | Pulse, amplitude 3 |

In some embodiments, the pulse position does not represent any information in itself. For example, if no idle period is applied, the pulse position (and the symbol duration) has a one-to-one relation with the amplitude of the pulse, and therefore cannot convey further information than the amplitude. For the example of FIG. 3, this would correspond to that the low-amplitude pulse 314 in pulse duration interval 303 is not available.

Generally, the position of the pulse may be selected from a set of available pulse positions. Alternatively or additionally, the amplitude may be selected from a set of available amplitudes. Yet alternatively or additionally, the carrier phase may be selected from a set of available carrier phases.

The set of available pulse positions may comprise (e.g., consist of) a first available pulse position starting one pulse duration interval after an end of a previous pulse, a last available pulse position starting a maximum integer multiple of pulse duration intervals after the end of the previous pulse, and any one or more intermediate available pulse positions, each starting a respective integer multiple of pulse duration intervals after the end of the previous pulse, wherein the respective integer is larger than one and smaller than the maximum integer.

If the maximum integer multiple is two, the set of available pulse positions may comprise (e.g., consist of) a first available pulse position starting one pulse duration interval after an end of a previous pulse (compare with pulse position 302 of FIG. 3), and a last available pulse position starting two pulse duration intervals after the end of the previous pulse (compare with pulse position 303 of FIG. 3). For this case, there are no intermediate available pulse positions.

If the maximum integer multiple is three, the set of available pulse positions may comprise (e.g., consist of) a first available pulse position starting one pulse duration interval after an end of a previous pulse, a last available pulse position starting three pulse duration intervals after the end of the previous pulse, and one intermediate available pulse position starting two pulse duration intervals after the end of the previous pulse.

If the maximum integer multiple is four, the set of available pulse positions may comprise (e.g., consist of) a first available pulse position starting one pulse duration interval after an end of a previous pulse, a last available pulse position starting four pulse duration intervals after the end of the previous pulse, and two intermediate available pulse positions; one starting two pulse duration intervals after the end of the previous pulse and one starting three pulse duration intervals after the end of the previous pulse.

The set of available amplitudes may comprise (e.g., consist of) a base amplitude and one or more integer multiples of the base amplitude. A maximum amplitude may correspond to a maximum integer multiple of the base amplitude.

Typically, each available pulse position is associated with a respective subset of the set of available amplitudes. Put differently, each available amplitude is associated with a respective subset of the set of available pulse positions.

For example, the pulse position 302 of FIG. 3 is associated with the relatively low amplitude shown for the pulse 312 (e.g., the base amplitude), and the pulse position 303 of FIG. 3 is associated with the relatively low amplitude shown for the pulse 314 (e.g., the base amplitude) as well as the relatively high amplitude shown for the pulse 315 (e.g., twice the base amplitude). If a next pulse position was shown in FIG. 3, is would be associated with the relatively low amplitude (e.g., the base amplitude), the relatively high amplitude (e.g., twice the base amplitude), and an even higher amplitude (e.g., three times the base amplitude); and so on.

Thus, for a particular available pulse position starting a number of pulse duration intervals after the end of the previous pulse, the cardinality of the respective subset of the set of available amplitudes can be equal to the number of pulse durations (i.e., first available pulse position starting one pulse duration interval after the end of the previous pulse has one available amplitude, second available pulse position starting two pulse duration intervals after the end of the previous pulse has two available amplitudes, third available pulse position starting three pulse duration intervals after the end of the previous pulse has three available amplitudes, and so on).

Alternatively, for a particular available pulse position starting a number of pulse duration intervals after the end of the previous pulse, the cardinality of the respective subset of the set of available amplitudes can be lower than the number of pulse durations (e.g., using only the higher amplitude(s) that are possible to generate for the particular available pulse position, or using only the lower amplitude(s) that are possible to generate for the particular available pulse position).

The maximum integer multiple used to define the maximum amplitude via the base amplitude may be equal to the maximum integer multiple used to define the last available pulse position in relation to the number of pulse duration intervals that are made available for loading after the end of the previous pulse. Alternatively, the maximum integer multiple used to define the maximum amplitude via the base amplitude may be lower than the maximum integer multiple used to define the last available pulse position in relation to the number of pulse duration intervals that are made available for loading after the end of the previous pulse.

Figure 4:
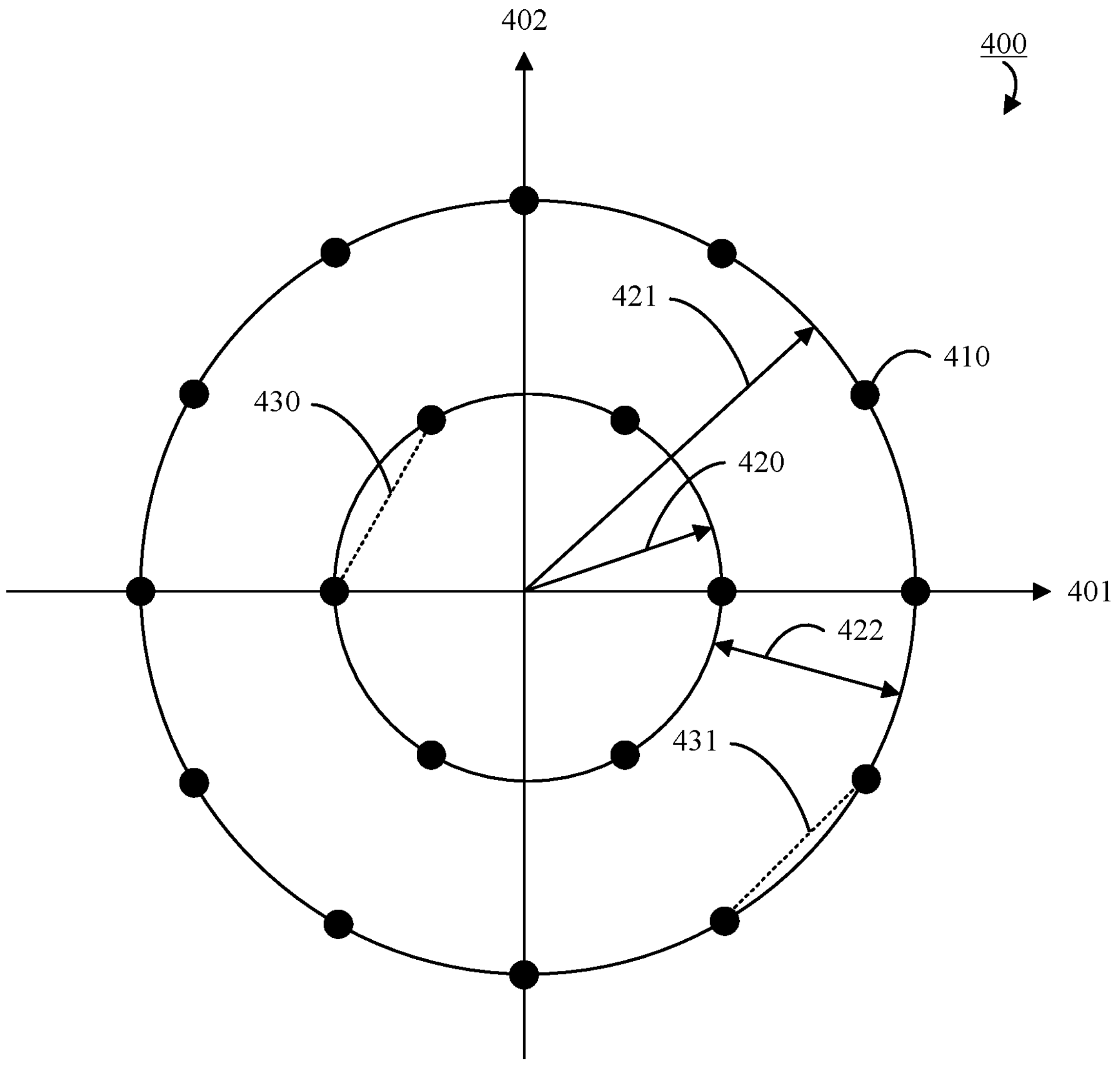
FIG. 4 is an in-phase/quadrature (I/Q) diagram illustrating an example APSK signal constellation according to some embodiments.

FIG. 4 illustrates an example APSK signal constellation 400 according to some embodiments. Generally, an APSK signal constellation (e.g., the APSK signal constellation 400) may be used in conjunction with the principles for pulse position and amplitude described earlier herein (e.g., in connection with FIG. 3).

For example, the APSK signal constellation 400 may be generated by any of the signal generators 200 of FIG. 2A and 220 of FIG. 2C. Alternatively or additionally, the APSK signal constellation 400 may be used for execution of the method 100 of FIG. 1.

The APSK signal constellation 400 is illustrated in an I/Q diagram where in-phase (I) signal components are represented in a first dimension 401 and quadrature (Q) signal components are represented in a second dimension 402 which is orthogonal to the first dimension, and each available combination of amplitude and carrier phase is represented as a constellation point 410.

FIG. 4 illustrates an example with two available amplitudes; a base amplitude 420 and twice the base amplitude 421. The available amplitude 420 is associated with a set of six available carrier phases (represented by the six constellation points on the smaller circle of FIG. 4), and the available amplitude 421 is associated with a set of twelve available carrier phases (represented by the twelve constellation points on the larger circle of FIG. 4).

Generally, each available amplitude may be associated with a respective set of available carrier phases. Typically, the set of available carrier phases grows with increasing amplitude (e.g., since the Euclidean distance 430, 431 between two constellation points with the same amplitude grows if the amplitude of the two constellation points is increased while not changing the carrier phase difference between the two constellation points).

If the base amplitude 420, which also defines the distance 422 between different rings of the APSK constellation, is chosen as the minimum Euclidean distance for the APSK constellation, it follows that the available amplitude that corresponds to an integer multiple N of the base amplitude can be associated with at most $\lfloor \pi/\sin^{-1}(\frac{1}{2}N) \rfloor$ available carrier phases (e.g., equidistantly spaced), where $\lfloor l \rfloor$ denotes the integer value of l. Thus, for a particular available amplitude which is a particular integer multiple, N, of the base amplitude, a cardinality of the respective set of available carrier phases could be lower than, or equal to, $\pi/\sin^{-1}(\frac{1}{2}N)$. Hence, when $\pi/\sin^{-1}(\frac{1}{2}N)$ is an integer L, the cardinality of the set of available carrier phases may be equal to the integer L (or any integer lower than L), and when $\pi/\sin^{-1}(\frac{1}{2}N)$ is not an integer, the cardinality of the set of available carrier phases may be an integer which is lower than $\pi/\sin^{-1}(\frac{1}{2}N)$; namely $\lfloor \pi/\sin^{-1}(\frac{1}{2}N) \rfloor$ (or any integer lower than $\lfloor \pi/\sin^{-1}(\frac{1}{2}N) \rfloor$).

Figure 5:
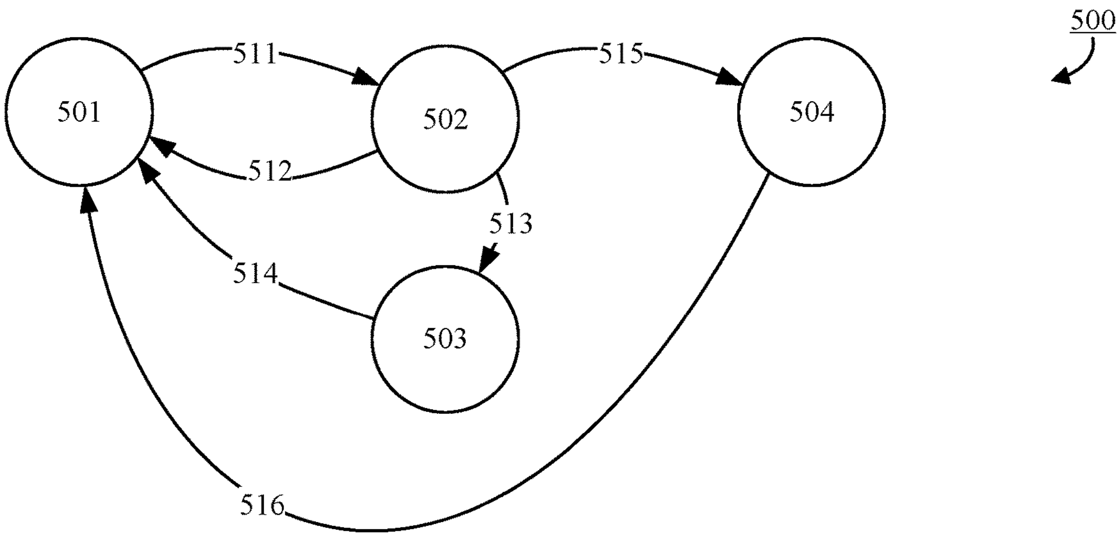
FIG. 5 is a state diagram illustrating example modulation symbol selection according to some embodiments.
Figure 6:
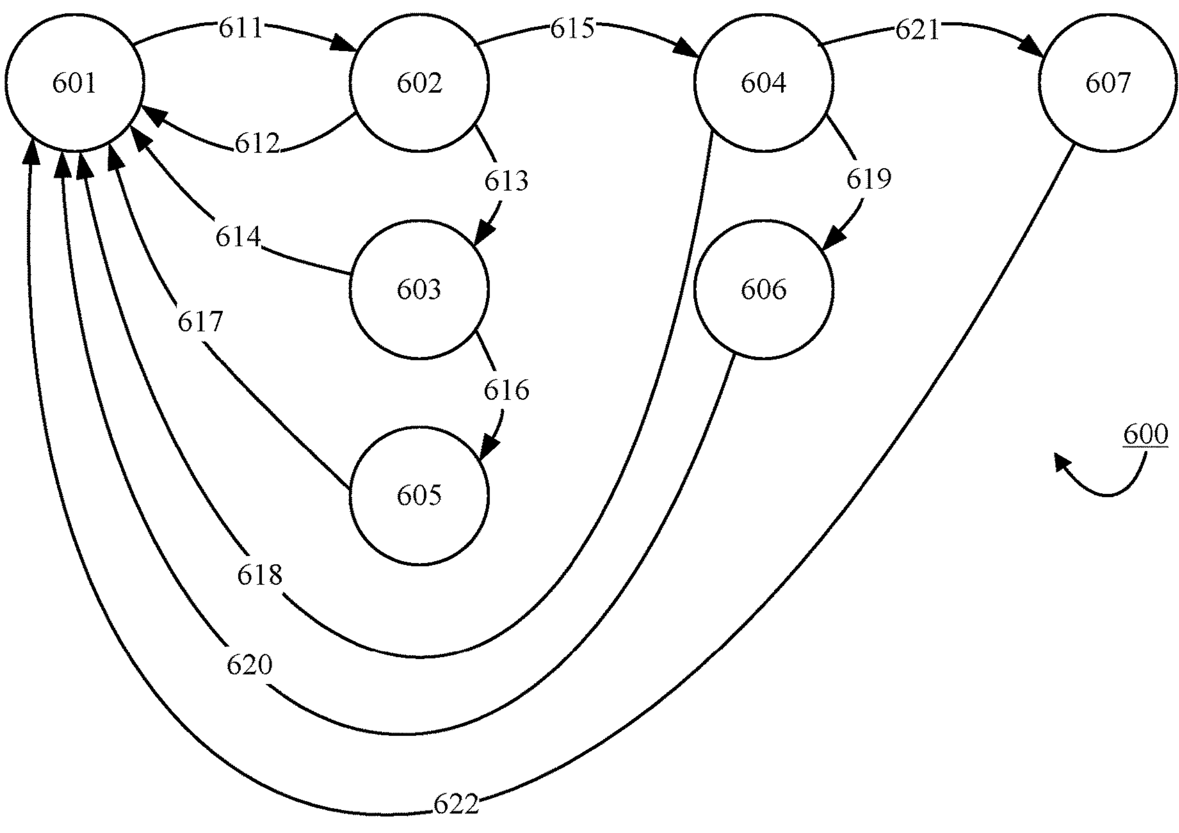
FIG. 6 is a state diagram illustrating example modulation symbol selection according to some embodiments.

FIGS. 5 and 6 exemplify modulation symbol selection according to some embodiments (more particularly selection of amplitude and pulse position) in the form of state diagrams 500, 600. For example, the state diagrams 500, 600 may be used for example executions of step 130 of FIG. 1.

The exemplification in FIGS. 3 and 4 may be considered as illustrating information modulation based on relative events (e.g., reference points in time), wherein an event relates to two subsequent modulation symbols. The carrier phase, the amplitude, and the pulse position are simultaneously modulated, and are dynamically adapted to the constraints of the signal generator.

FIG. 5 represents selection of amplitude and pulse position for an example with two available pulse positions (compare with FIG. 3), and the state diagram 500 has four states 501, 502, 503, 504. Each state transition corresponds to a passing of a pulse duration interval (compare with 301, 302, 303 of FIG. 3).

State 501 corresponds to the start of the first pulse duration interval (compare with 320; the start of 301 of FIG. 3) after the pulse of a previous modulation symbol (compare with the end of 300 of FIG. 3). As already explained, it may not be possible to produce a pulse for the first pulse duration interval after the pulse of a previous modulation symbol. Hence, there is no available amplitude for state 501. There is only one possible transition from state 501. This is represented by transition 511 (corresponding to zero amplitude, i.e., no pulse, in the first pulse duration interval) to state 502.

State 502 corresponds to the start of the second pulse duration interval (compare with the start of 302 of FIG. 3) after the pulse of a previous modulation symbol. As already explained, it may only be possible to produce a pulse with relatively low amplitude (e.g., the base amplitude) for the second pulse duration interval after the pulse of a previous modulation symbol. Hence, there is only one available amplitude for state 502. There are three possible transitions from state 502. This is represented by transition 515 (corresponding to zero amplitude, i.e., no pulse, in the second pulse duration interval) to state 504, transition 513 (also corresponding to zero amplitude, i.e., no pulse, in the second pulse duration interval) to state 503, and transition 512 (corresponding to a pulse with the base amplitude, compare with 312 of FIG. 3) back to state 501.

States 503 and 504 correspond to the start of the third pulse duration interval (compare with the start of 303 of FIG. 3) after the pulse of a previous modulation symbol. As already explained, it may be possible to produce a pulse with the base amplitude, or a pulse with twice the base amplitude, for the third pulse duration interval after the pulse of a previous modulation symbol. Each of the two available amplitudes is associated with a respective one of the states; state 503 is associated with the base amplitude and state 504 is associated with twice the base amplitude.

Since the third pulse duration interval represents the last one of the two available pulse positions, each transition from states 503 and 504 should correspond to a pulse and lead back to state 501. This is represented by transition 514 (corresponding to a pulse with the base amplitude, compare with 314 of FIG. 3) for state 503, and by transition 516 (corresponding to a pulse with twice the base amplitude, compare with 315 of FIG. 3) for state 504.

FIG. 6 represents selection of amplitude and pulse position for an example with three available pulse positions, and the state diagram 600 has seven states 601, 602, 603, 604, 605, 606, 607. Each state transition corresponds to a passing of a pulse duration interval.

State 601 corresponds to the start of the first pulse duration interval after the pulse of a previous modulation symbol, and there is no available amplitude for state 601. There is only one possible transition from state 601. This is represented by transition 611 (corresponding to zero amplitude, i.e., no pulse, in the first pulse duration interval) to state 602.

State 602 corresponds to the start of the second pulse duration interval after the pulse of a previous modulation symbol, and there is only one available amplitude (the base amplitude) for state 602. There are three possible transitions from state 602. This is represented by transition 615 (corresponding to zero amplitude, i.e., no pulse, in the second pulse duration interval) to state 604, transition 613 (also corresponding to zero amplitude, i.e., no pulse, in the second pulse duration interval) to state 603, and transition 612 (corresponding to a pulse with the base amplitude) back to state 601.

States 603 and 604 correspond to the start of the third pulse duration interval after the pulse of a previous modulation symbol, for which there are two available amplitudes (the base amplitude and twice the base amplitude). Each of the two available amplitudes is associated with a respective one of the states; state 603 is associated with the base amplitude and state 604 is associated with twice the base amplitude.

From state 603, there are two possible transitions. This is represented by transition 616 (corresponding to zero amplitude, i.e., no pulse, in the third pulse duration interval) to state 605, and transition 614 (corresponding to a pulse with the base amplitude) back to state 601.

From state 604, there are three possible transitions. This is represented by transition 621 (corresponding to zero amplitude, i.e., no pulse, in the third pulse duration interval) to state 607, transition 619 (also corresponding to zero amplitude, i.e., no pulse, in the third pulse duration interval) to state 606, and transition 618 (corresponding to a pulse with twice the base amplitude) back to state 601.

States 605, 606 and 607 correspond to the start of the fourth pulse duration interval after the pulse of a previous modulation symbol, for which there are three available amplitudes (the base amplitude, twice the base amplitude, and three times the base amplitude). Each of the three available amplitudes is associated with a respective one of the states; state 605 is associated with the base amplitude, state 606 is associated with twice the base amplitude, and state 607 is associated with three times the base amplitude.

Since the fourth pulse duration interval represents the last one of the three available pulse positions, each transition from states 605, 606 and 607 should correspond to a pulse and lead back to state 601. This is represented by transition 617 (corresponding to a pulse with the base amplitude) for state 605, by transition 620 (corresponding to a pulse with twice the base amplitude) for state 606, and by transition 622 (corresponding to a pulse with three times the base amplitude) for state 607.

Figure 7:
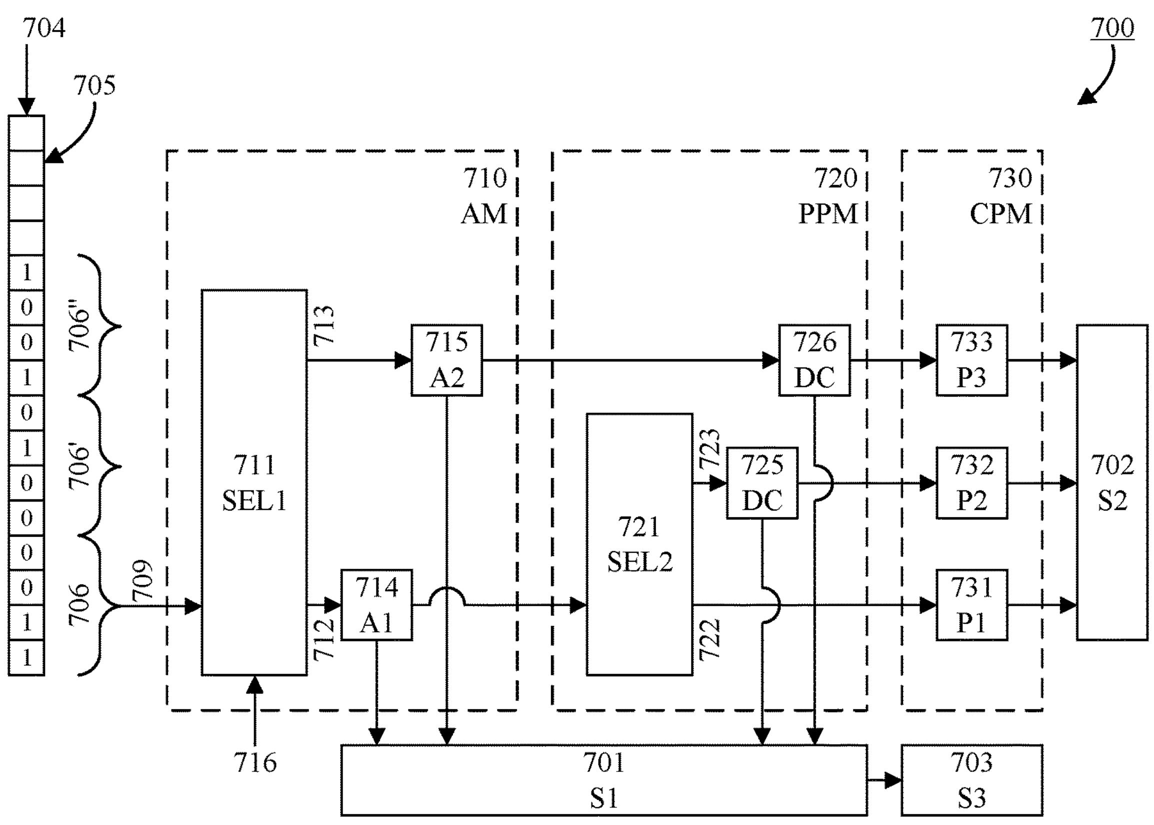
FIG. 7 is a schematic block diagram illustrating an example arrangement according to some embodiments.
Figure 7:
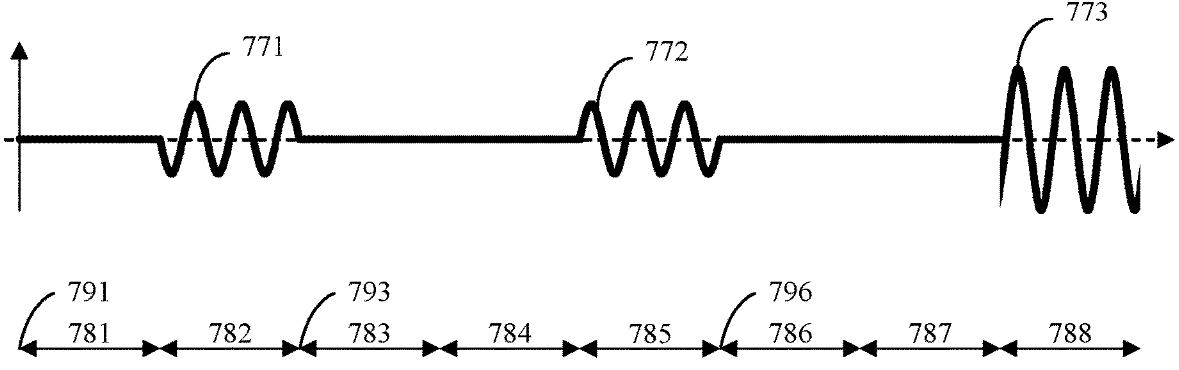

FIG. 7 schematically illustrates an example arrangement 700 according to some embodiments. The arrangement 700 is suitable for providing a modulated signal for transmission. For example, the arrangement 700 may be comprised, or comprisable, in a transmitter (e.g., a transmitter of a communication device). Alternatively or additionally, the arrangement 700 may be configured to perform at least some step(s) of the method 100 of FIG. 1.

The arrangement 700 exemplifies signal generation wherein there are two available amplitudes—one low amplitude (e.g., the base amplitude) and one high amplitude (e.g., twice the base amplitude), two available pulse positions—an early pulse position (compare with 302 of FIG. 3) and a late pulse position (compare with 303 of FIG. 3), six available carrier phases for the low amplitude, and twelve available carrier phases for the high amplitude.

The arrangement 700 comprises a FIFO (first in-first out) stack 705, which is configured to receive information to be modulated via an input 704, and provide blocks 706, 706', 706" of information to be modulated via an output 709.

The block of information 706 provided at the output 709 of the FIFO stack 705 is denoted by X in the following and assumed to have a value between 0 and 15.

The block of information X input to a first selector (SEL1) 711. For certain values of X (e.g., X≤7), the first selector 711 selects the processing path 712 which includes using the low amplitude, as illustrated by the low amplitude block (A1) 714. For other values of X (e.g., X≥8), the first selector 711 selects the processing path 713 which includes using the high amplitude, as illustrated by the high amplitude block (A2) 715.

For the processing path 712 corresponding to the low amplitude, the block of information X is relayed and input to a second selector (SEL2) 721. For certain values of X (e.g., X≤3), the second selector 721 selects the processing path 722 which includes using the early pulse position. For other values of X (e.g., X≥4), the second selector 721 selects the processing path 723 which includes using the late pulse position.

For the processing path 723, the start of the loading period is delayed in relation to processing path 722 to align timing with the late pulse position, which is illustrated by the delay control block (DC) 725 (causing a delay of the activation of S1). For the processing paths 723 and 713, the end of the loading period is delayed in relation to processing path 722, which is illustrated by the delay control blocks (DC) 725 and 726 (causing a delay of the deactivation of S1, and corresponding deactivation of S3 to output the pulse).

The first selector 711, the low amplitude block 714, and the high amplitude block 715 may be seen as implementing an amplitude modulator (AM) 710. The second selector 721, and the delay control blocks 725, 726 may be seen as implementing a pulse position modulator (PPM) 720.

The amplitude modulator 710 and the pulse position modulator 720 together control a first switch (S1; compare with 201 of FIG. 2A) 701.

For use of the high amplitude (A2) and the late pulse position, the first switch 701 is turned ON without delay to trigger start of the loading period, and turned OFF in connection with the start of the late pulse position as controlled by the delay control block 726. The duration of the loading period corresponds to the high amplitude.

For use of the low amplitude (A1) and the early pulse position, the first switch 701 is also turned ON without delay to trigger start of the loading period, and turned OFF in connection with the start of the early pulse position. The duration of the loading period corresponds to the low amplitude.

For use of the low amplitude (A1) and the late pulse position, the first switch 701 is turned ON to trigger start of the loading period after a delay as controlled by the delay control block 725, and turned OFF in connection with the start of the late pulse position as controlled by the delay control block 725. The duration of the loading period corresponds to the low amplitude.

For the processing path 722 corresponding to the low amplitude, the block of information X is relayed and input to a first carrier phase shifter (P1) 731. The first carrier phase shifter 731 is configured to select the carrier phase based on the block of information X (e.g., as 60X degrees).

For the processing path 723 corresponding to the low amplitude, the block of information X is also relayed and input to a second carrier phase shifter (P2) 732. The second carrier phase shifter 732 is configured to select the carrier phase based on the block of information X (e.g., as 60(X−4) degrees).

For the processing path 713 corresponding to the high amplitude, the block of information X is relayed and input to a third carrier phase shifter (P3) 733. The third carrier phase shifter 733 is configured to select the carrier phase based on the block of information X (e.g., as 30(X−8) degrees).

The first, second and third carrier phase shifter 731, 732, 733 may be seen as implementing a carrier phase modulator (CPM) 730. The carrier phase modulator 730 controls a second switch (S2; compare with 202 of FIG. 2A) 702. For example, the second switch may be configured to toggle between ON and OFF to implement mixing with a carrier frequency.

The toggling may be provided based on an oscillator (e.g., a local oscillator operating at the carrier frequency), and the carrier phase modulator 730 causes a phase shift of the carrier. The duration of the toggling (i.e., the mixing period) may have a length that correspond to the pulse duration, and may start in association with the start of the pulse (e.g., slightly previous to the start of the pulse to allow the mixed signal to traverse the transmission line; compare with FIG. 2B). For example, the start of the mixing period may coincide with the first switch being turned OFF.

The arrangement 700 also comprises a third switch (S3; compare with 203 of FIG. 2A) 703. The third switch is controlled to be turned OFF for a pulse duration starting when the selected (early/late) pulse position starts. This may be implemented by controlling the third switch as a function of the first switch. For example, turning the first switch OFF may trigger turning the third switch OFF (e.g., with a delay to allow the mixed signal to traverse the transmission line) and the duration of the OFF period may be hardcoded.

When a pulse has been produced, the arrangement 700 may be reset to process a new block of information 706'. This is exemplified in FIG. 7 by a reset signal 716.

Below the arrangement 700 three consecutive modulation symbols (e.g., generated by the arrangement 700) are shown in a time diagram.

A first reference point in time 791 relates to the first modulation symbol, and may indicate reset 716 of the arrangement 700. The first modulation symbol is based on a first block of information 706 and X=3 ($0011_2$). Hence, path 712, 722 is selected; corresponding to the low amplitude and the early pulse position, and the phase shift becomes 60X=180 degrees. Consequently the first modulation symbol comprises a relatively short silent period in pulse duration interval 781, and a pulse 771 in pulse duration interval 782, wherein pulse duration interval 781 is configured to accommodate loading. For example, S1 may be turned ON in association with the start of 781 (e.g., $t_d$ before 781 starts) and OFF in association with the end of 781 (e.g., $t_d$ before 781 ends), and S3 may be turned OFF when 782 starts and ON when 782 ends. The toggling of S2 may start slightly before 782 starts (e.g., together with turning S1 OFF) and end slightly before 782 ends.

A second reference point in time 793 relates to the second modulation symbol, and may indicate reset 716 of the arrangement 700. The second modulation symbol is based on a second block of information 706' and X=4 ($0100_2$). Hence, path 712, 723 is selected; corresponding to the low amplitude and the late pulse position, and the phase shift becomes 60(X−4)=0 degrees. Consequently the second modulation symbol comprises a relatively long silent period in pulse duration intervals 783 and 784, and a pulse 772 in pulse duration interval 785, wherein pulse duration interval 784 is configured to accommodate loading. For example, S1 may be turned ON in association with the start of 784 and OFF in association with the end of 784, and S3 may be turned OFF when 785 starts and ON when 785 ends. The toggling of S2 may start slightly before 785 starts (e.g., together with turning S1 OFF) and end slightly before 785 ends. At the start of 783, S1 and S2 may be OFF and S3 may be ON.

A third reference point in time 796 relates to the third modulation symbol, and may indicate reset 716 of the arrangement 700. The third modulation symbol is based on a third block of information 706" and X=9 ($1001_2$). Hence, path 713 is selected; corresponding to the high amplitude (and the late pulse position), and the phase shift becomes 30(X−8)=30 degrees. Consequently the third modulation symbol comprises a relatively long silent period in pulse duration intervals 786 and 787, and a pulse 773 in pulse duration interval 788, wherein pulse duration intervals 786 and 787 are configured to accommodate loading. For example, S1 may be turned ON in association with the start of 786 and OFF in association with the end of 787, and S3 may be turned OFF when 788 starts and ON when 788 ends. The toggling of S2 may start slightly before 788 starts (e.g., together with turning S1 OFF) and end slightly before 788 ends.

One visualization of the function of the arrangement 700 is provided by the following table, where X=$[b3\ b2\ b1\ b0]_2$, and position 1 refers to the early pulse position and position 2 refers to the late pulse position. It should be noted that the block of information X is not limited to using base 2 (binary) representation as exemplified in table. Contrarily, block of information X may be represented using any suitable number base (e.g., base 24 to populate all possible modulation symbols).

| Amplitude (N) | Position | Phase (degrees) | X | b3 | b2 | b1 | b0 |
|---|---|---|---|---|---|---|---|
| 1 | 1 | 0 | 0 | 0 | 0 | 0 | 0 |
| 1 | 1 | 60 | 1 | 0 | 0 | 0 | 1 |
| 1 | 1 | 120 | 2 | 0 | 0 | 1 | 0 |
| 1 | 1 | 180 | 3 | 0 | 0 | 1 | 1 |
| 1 | 1 | 240 | | | | | |
| 1 | 1 | 300 | | | | | |
| 1 | 2 | 0 | 4 | 0 | 1 | 0 | 0 |
| 1 | 2 | 60 | 5 | 0 | 1 | 0 | 1 |
| 1 | 2 | 120 | 6 | 0 | 1 | 1 | 0 |
| 1 | 2 | 180 | 7 | 0 | 1 | 1 | 1 |
| 1 | 2 | 240 | | | | | |
| 1 | 2 | 300 | | | | | |
| 2 | 2 | 0 | 8 | 1 | 0 | 0 | 0 |
| 2 | 2 | 30 | 9 | 1 | 0 | 0 | 1 |
| 2 | 2 | 60 | 10 | 1 | 0 | 1 | 0 |
| 2 | 2 | 90 | 11 | 1 | 0 | 1 | 1 |
| 2 | 2 | 120 | 12 | 1 | 1 | 0 | 0 |

-continued

| Amplitude (N) | Position | Phase (degrees) | X | b3 | b2 | b1 | b0 |
|---|---|---|---|---|---|---|---|
| 2 | 2 | 150 | 13 | 1 | 1 | 0 | 1 |
| 2 | 2 | 180 | 14 | 1 | 1 | 1 | 0 |
| 2 | 2 | 210 | 15 | 1 | 1 | 1 | 1 |
| 2 | 2 | 240 | | | | | |
| 2 | 2 | 270 | | | | | |
| 2 | 2 | 300 | | | | | |
| 2 | 2 | 330 | | | | | |

Figure 8:
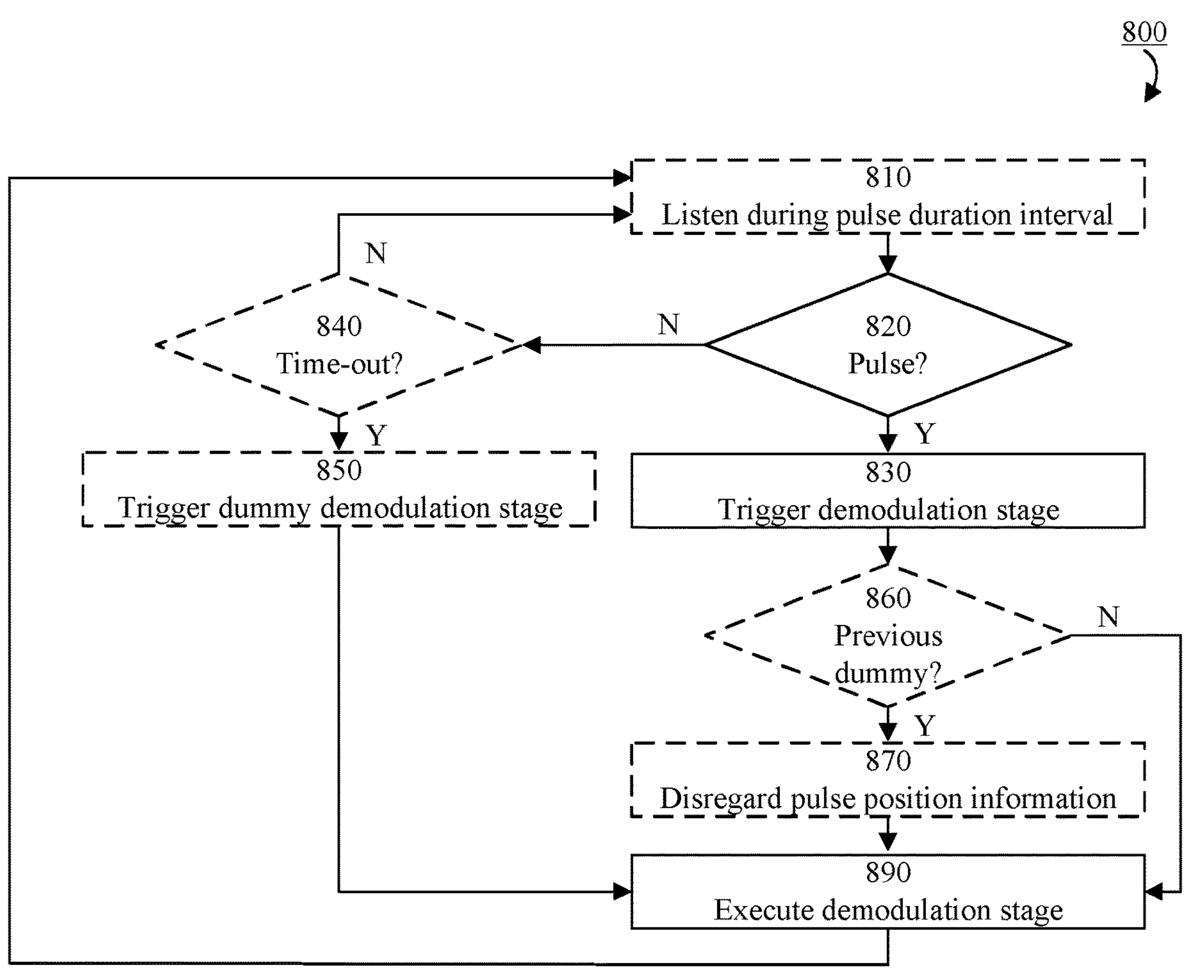
FIG. 8 is a flowchart illustrating example method steps according to some embodiments.

FIG. 8 illustrates an example method 800 according to some embodiments. The method 800 is a method of processing a received signal of modulation symbols, wherein each modulation symbol belongs to a collection of available modulation symbols. For example, the method 800 may be performed by a receiver (e.g., a receiver of a communication device).

Each available modulation symbol has a symbol duration, and at least two of the available modulation symbols have different symbol durations. Furthermore, each available modulation symbol comprises a pulse, and indicates the information to be modulated by a combination of the amplitude of the pulse, the carrier phase of the pulse, and (possibly) the position of the pulse. For example, the method 800 may be suitable for processing a received signal generated in accordance with the method 100 of FIG. 1.

The method 800 comprises triggering execution of a demodulation stage (illustrated by step 890) responsive to reception of a pulse. Generally, a demodulation stage may be any suitable demodulation stage. For example, a demodulation stage may be represented by a transition of a demodulator state machine, and/or by a transition in a demodulation trellis.

In some embodiments, a demodulator state machine and/or a demodulation trellis may be based on a state diagram for modulation symbol selection which was applied in the transmitter (compare with 500 of FIG. 5 and 600 of FIG. 6). With reference to FIG. 5, each transition of a demodulator state machine and/or demodulation trellis may correspond to a particular sequence of transitions that start and end in state 501; and correspondingly for FIG. 6.

Since the available modulation symbols have different symbol durations (and different pulse positions), the demodulation stages are asynchronously triggered responsive to reception of a pulse, and not at regular time intervals (as would be the case if all available modulation symbols had the same symbol duration).

The asynchronous operation is exemplified by optional step 810, wherein the receiver listens during a pulse duration interval, and step 820, wherein it is determined whether or not a pulse was detected in the pulse duration interval.

When a pulse was detected in the pulse duration interval (Y-path out of step 820), execution of a demodulation stage is triggered, as illustrated by step 830.

When no pulse was detected in the pulse duration interval (N-path out of step 820), the reason might be that the pulse duration interval was comprised in the silent period of an available modulation symbol, in which case it is preferable to return to step 810 and continue listening during the subsequent pulse duration interval.

However, when no pulse was detected in the pulse duration interval (N-path out of step 820), the reason might also be that a transmitted pulse could not be detected (e.g., due to low received signal strength or low signal-to-interference ratio, SIR).

Typically, it may be cumbersome for the receiver to determine which reason caused that no pulse was detected in the pulse duration interval. However, when no pulse has been detected by the last available pulse position (starting a maximum integer multiple of pulse duration intervals after the end of the previous pulse) it can be concluded that (at least) one transmitted pulse has been missed (i.e., could not be detected).

One way to utilize this realization is exemplified by optional step 840, which is a time-out function executed when no pulse was detected in the pulse duration interval (N-path out of step 820).

When time-out has not been reached (i.e., when the last available pulse position has not been listened to; N-path out of step 840) the method 800 assumes that no pulse was detected because the pulse duration interval was comprised in the silent period, and returns to step 810 to continue listening for the expected pulse. It should be noted that this assumption may be erroneous, and that a pulse was transmitted but not detected (e.g., due to high signal-to-noise ratio and/or low received power).

When time-out has been reached (i.e., when the last available pulse position has been listened to; Y-path out of step 840) it can be concluded that no pulse was detected because (at least) one transmitted pulse has been missed.

The method 800 suggest mitigating the problem with missed pulses by triggering execution of a dummy demodulation stage when the last available pulse position has been listened to without pulse detection, as illustrated by optional step 850. Thus, responsive to absence of pulse reception for a maximum integer multiple of pulse duration intervals after the end of the previous pulse, execution of a dummy demodulation stage may be triggered.

For example, triggering execution of a dummy demodulation stage may comprise setting received symbol metrics for amplitude, carrier phase, and pulse position to values that correspond to complete lack of information, and executing the demodulation stage based on those values, as illustrated by step 890. Values the correspond to lack of information may be achieved, for example, by using average values (e.g., average amplitude and carrier phase of the applicable APSK signal constellation), and/or by setting SIR to minus infinity.

It is typically more likely that a single transmitted pulse has been missed than that two (or more) transmitted pulses have been missed (e.g., since there are typically more available symbols with relatively long symbol duration than with short symbol duration). Thus, it may be preferable to trigger execution of a single dummy demodulation stage in step 850. However, it should be noted that some embodiments may comprise triggering execution of more than one dummy demodulation stage in step 850.

To handle the uncertainty regarding how many pulses have been missed, some embodiments suggest following two or more demodulation hypotheses (e.g., the most likely, or all possible) regarding the number of missed pulses, and deciding between the demodulation hypotheses based on a maximum likelihood (ML) approach for state machine or trellis execution.

Alternatively or additionally to trigger execution of the dummy demodulation stage, the receiver may request the transmitter to resend all pulses after the latest detected pulse; possibly starting by a reference pulse that does not carry any information in the pulse position.

The execution of a demodulation stage, as illustrated by step 890, when trigged responsive to reception of a pulse, uses the amplitude and carrier phase (and, when applicable, the position of the pulse) as input for the demodulation, and the demodulation stage is executed according to any suitable approach. Typically, the execution of a demodulation stage, as illustrated by step 890, when trigged responsive to reception of a pulse, uses the amplitude, the carrier phase, and the position of the pulse as input for the demodulation, and the demodulation stage is executed according to any suitable approach.

When the received pulse is a first pulse after execution of a dummy demodulation stage, it may be preferable to disregarding any information carried by the position of the first pulse. This is due to that, if a pulse was missed, the pulse position information is not trustworthy for the subsequent pulse. This approach is illustrated by optional step 860, in which it is determined whether the previous demodulation stage execution was a dummy demodulation stage. If so (Y-path out of step 860), the pulse position information is disregarded, as illustrated by optional step 870. Otherwise (N-path out of step 860), the pulse position information is not disregarded.

Regardless of why it was triggered, an execution of a demodulation stage according to step 890 may comprise setting a reference point in time in relation to the (possibly assumed) pulse position for which the demodulation stage was triggered. The reference point in time may be used for determining the pulse position of a subsequently received pulse. For example, the reference point in time may be set by the receiver according to the same principles as those applied for the reference point in time used by the transmitter.

It should be noted that the receiver may utilize knowledge regarding the collection of available modulations symbols to improve the performance. For example, such knowledge may be accounted for in metric values used as input to the demodulation.

Some examples of knowledge regarding the collection of available modulations symbols that may be used for decoding relates to that some amplitudes may be determined to be non-available when the pulse position is detected (e.g., only the base amplitude may be available for the first pulse position), and that some carrier phases may be determined to be non-available when the amplitude is estimated (e.g., fewer carrier phases may be available for a low amplitude than for a high amplitude).

Figure 9:
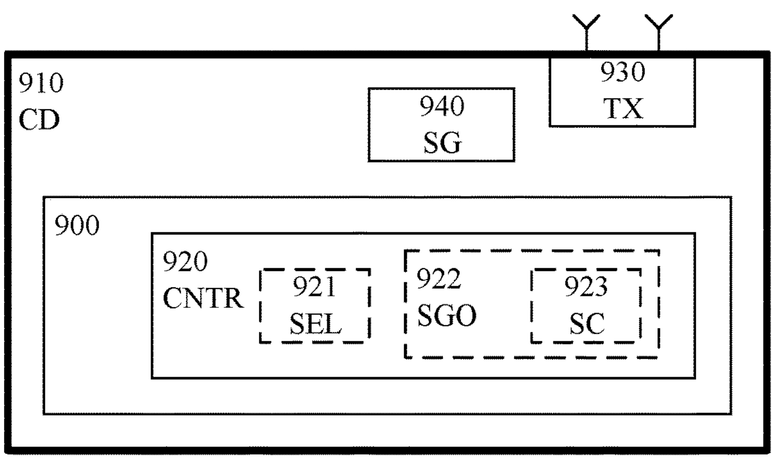
FIG. 9 is a schematic block diagram illustrating an example apparatus according to some embodiments.

FIG. 9 schematically illustrates an example apparatus 900 according to some embodiments. The apparatus 900 is suitable for providing a modulated signal for transmission. For example, the apparatus 900 may be configured to cause performance of (e.g., perform) at least some step(s) of the method 100 of FIG. 1.

Alternatively or additionally, the apparatus 900 may be comprised, or comprisable, in a communication device (CD; e.g., a user equipment, UE, or a radio access node, such as a base station) 910. Yet alternatively or additionally, the apparatus 900 may be associated with (e.g.; connected, or connectable, to; or comprised, or comprisable, in) a transmitter (TX; e.g., transmission circuitry) 930.

The apparatus 900 is associated with a signal generator (SG; e.g., generating circuitry or a generation module) 940.

For example, the signal generator 940 may comprise a transmission line and/or may correspond to the signal generator 200 of FIG. 2A or the signal generator 220 of FIG. 2C.

The apparatus 900 comprises a controller (CNTR; e.g., controlling circuitry or a control module) 920. For example, the controller 920 may comprise at least parts of the arrangement 700 of FIG. 7.

The controller 920 is configured to cause selection of a modulation symbol from a collection of available modulation symbols for representation of a block of information to be modulated (compare with step 120 of FIG. 1).

To this end, the controller 920 may comprise or be otherwise associated with (e.g., connected, or connectable, to) a selector (SEL; e.g., selecting circuitry or a selection module) 921. The selector 921 may be configured to select a modulation symbol from a collection of available modulation symbols for representation of a block of information to be modulated. For example, the selector may comprise one or more of the first selector 711, the second selector 721, and the carrier phase shifters 731, 732, 733 of FIG. 7.

The controller 920 is configured to cause operation of the signal generator 940 to provide the selected modulation symbol for transmission (compare with step 130 of FIG. 1).

To this end, the controller 920 may comprise or be otherwise associated with (e.g., connected, or connectable, to) a signal generator operator (SGO; e.g., operating circuitry or an operation module) 922. The signal generator operator 922 may be configured to operate the signal generator 940 to provide the selected modulation symbol for transmission.

For example, the controller 920 may be configured to control the switches S1, S2, S3 as exemplified earlier herein.

To this end, the controller 920 may comprise or be otherwise associated with (e.g., connected, or connectable, to) a switch controller (SC; e.g., switch controlling circuitry or a switch control module) 923, which is illustrated in FIG. 9 as comprised in the signal generator operator 922. The switch controller 922 may be configured to control switches S1, S2, S3 of the signal generator 940 to provide the selected modulation symbol for transmission.

Once provided by the signal generator 940, the selected modulation symbol may be transmitted by the transmitter 930.

It should be noted that any suitable features described herein (e.g., in connection with one or more of FIGS. 1-7) may be equally applicable—mutatis mutandis—for the apparatus 900, even if not explicitly mentioned in connection with FIG. 9.

Figure 10:
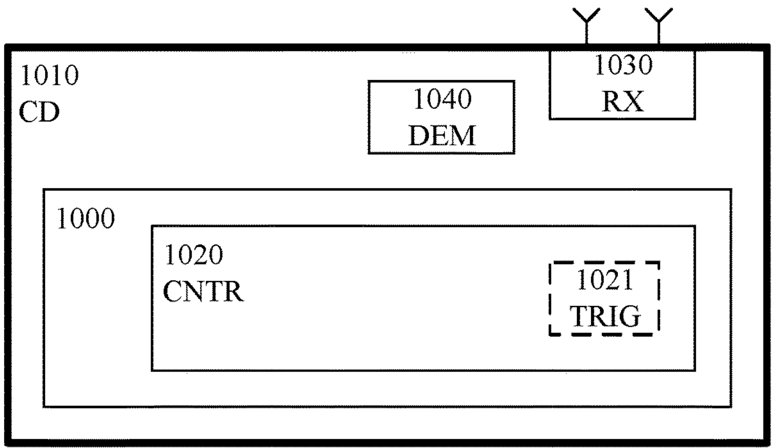
FIG. 10 is a schematic block diagram illustrating an example apparatus according to some embodiments.

FIG. 10 schematically illustrates an example apparatus 1000 according to some embodiments. The apparatus 1000 is suitable for processing a received signal of modulation symbols (e.g., a signal provided by the signal generator 940 of FIG. 9). For example, the apparatus 1000 may be configured to cause performance of (e.g., perform) at least some step(s) of the method 800 of FIG. 8.

Alternatively or additionally, the apparatus 1000 may be comprised, or comprisable, in a communication device (CD; e.g., a user equipment, UE, or a radio access node, such as a base station) 1010. Yet alternatively or additionally, the apparatus 1000 may be associated with (e.g.; connected, or connectable, to; or comprised, or comprisable, in) a receiver (RX; e.g., reception circuitry) 1030.

The apparatus 1000 is associated with a demodulator (DEM; e.g., demodulating circuitry or a demodulation module) 1040.

The apparatus 1000 comprises a controller (CNTR; e.g., controlling circuitry or a control module) 1020.

The controller 1020 is configured to cause asynchronous triggering of execution of a demodulation stage, responsive to reception of a pulse (compare with steps 820, 830, 890 of FIG. 8).

To this end, the controller 1020 may comprise or be otherwise associated with (e.g., connected, or connectable, to) a triggerer (TRIG; e.g., triggering circuitry or a trigger module) 1021. The triggerer 1021 may be configured to asynchronously trigger the demodulator 1040 to execute a demodulation stage, responsive to reception of a pulse via the receiver 1030.

It should be noted that any suitable features described herein (e.g., in connection with one or more of FIGS. 3, 4, and 8) may be equally applicable—mutatis mutandis—for the apparatus 1000, even if not explicitly mentioned in connection with FIG. 10.

In fact, it should be generally noted that any feature(s) described herein in connection with one Figure may be equally applicable—mutatis mutandis—for the context of another Figure, even if not explicitly mentioned in connection thereto.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a communication device (e.g., a user equipment, UE, or a radio access node).

Embodiments may appear within an electronic apparatus (such as a communication device) comprising arrangements, circuitry, and/or logic according to any of the embodiments described herein. Alternatively or additionally, an electronic apparatus (such as a communication device) may be configured to perform methods according to any of the embodiments described herein.

Figure 11:
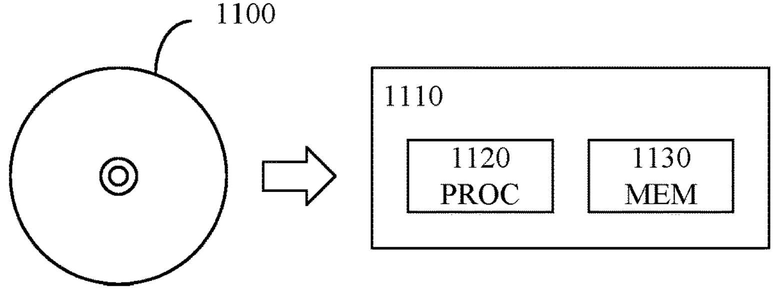
FIG. 11 is a schematic drawing illustrating an example computer readable medium according to some embodiments.

According to some embodiments, a computer program product comprises a non-transitory computer readable medium such as, for example, a universal serial bus (USB) memory, a plug-in card, an embedded drive, or a read only memory (ROM). FIG. 11 illustrates an example computer readable medium in the form of a compact disc (CD) ROM 1100. The computer readable medium has stored thereon a computer program comprising program instructions. The computer program is loadable into a data processor (PROC; e.g., a data processing unit) 1120, which may, for example, be comprised in a communication device 1110. When loaded into the data processor, the computer program may be stored in a memory (MEM) 1130 associated with, or comprised in, the data processor. According to some embodiments, the computer program may, when loaded into, and run by, the data processor, cause execution of method steps according to, for example, any of the methods as illustrated in FIGS. 1 and 8, or as otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of providing a modulated signal for transmission, the method comprising:

setting a reference point in time for a current block of information to be modulated, wherein the reference point in time is related to an end of a pulse of a previous modulation symbol;

selecting a modulation symbol from a collection of available modulation symbols for representation of the current block of information to be modulated, wherein each available modulation symbol has a symbol duration, comprises a pulse, and indicates the information by a combination of an amplitude of the pulse and a carrier phase of the pulse, wherein a position of the pulse is defined within the symbol duration of the available modulation symbol, and wherein at least two of the available modulation symbols have different symbol durations, wherein selecting the modulation symbol for representation of the current block of information to be modulated comprises specifying the position of the pulse in relation to the reference point in time for the current block of information; and operating a signal generator to provide the selected modulation symbol for transmission.

2. The method of claim 1, wherein the combination by which each available modulation symbol indicates the information further comprises the position of the pulse.

3. The method of claim 1, wherein the pulse of an available modulation symbol represents an end of the available modulation symbol, and the pulse is preceded by a silent period.

4. The method of claim 1, wherein the position of the pulse is selected from a set of available pulse positions, and/or wherein the amplitude is selected from a set of available amplitudes.

5. The method of claim 4, wherein the set of available pulse positions comprises a first available pulse position starting one pulse duration interval after an end of a previous pulse, a last available pulse position starting a maximum integer multiple of pulse duration intervals after the end of the previous pulse, and any one or more intermediate available pulse positions, each starting a respective integer multiple of pulse duration intervals after the end of the previous pulse, wherein the respective integer is larger than one and smaller than the maximum integer.

6. The method of claim 4, wherein each available pulse position is associated with a respective subset of the set of available amplitudes.

7. The method of claim 6, wherein, for a particular available pulse position starting a number of pulse duration intervals after the end of the previous pulse, a cardinality of the respective subset corresponds to the number of pulse durations.

8. The method of claim 4, wherein the set of available amplitudes comprises a base amplitude and one or more integer multiples of the base amplitude.

9. The method of claim 4, wherein each available amplitude is associated with a respective set of available carrier phases.

10. The method of claim 9, wherein the position of the pulse is selected from a set of available pulse positions, and/or wherein the amplitude is selected from a set of available amplitudes, wherein the set of available amplitudes comprises a base amplitude and one or more integer multiples of the base amplitude, and wherein, for a particular available amplitude which is a particular integer multiple, N, of the base amplitude, a cardinality of the respective set of available carrier phases is lower than, or equal to, $\pi/\sin^{-1}(1/2N)$.

11. The method of claim 1, wherein operating the signal generator comprises triggering a start of a loading period of the signal generator within the symbol duration and prior to a start of the pulse, wherein the loading period ends at the start of the pulse and has a length that corresponds to the amplitude of the pulse.

12. The method of claim 1, wherein the signal generator comprises an amplitude controller, a carrier phase controller, a pulse position controller, and a transmission line, wherein operating the signal generator comprises:

activating the amplitude controller to accumulate energy on the transmission line, wherein the energy relates to the amplitude of the pulse;

after accumulation of the energy, repeatedly activating the carrier phase controller to provide mixing of the amplitude with a carrier frequency, wherein a periodicity of the repeated activation is based on the carrier frequency and a timing of the repeated activation corresponds to the carrier phase of the pulse; and activating the pulse position controller to release energy for the pulse, wherein a timing of the release corresponds to the position of the pulse.

13. A method of processing a received signal of modulation symbols, wherein each modulation symbol belongs to a collection of available modulation symbols, has a symbol duration, comprises a pulse, and indicates information by a combination of an amplitude of the pulse and a carrier phase of the pulse, wherein a position of the pulse is defined within the symbol duration of the available modulation symbol, and wherein at least two of the available modulation symbols have different symbol durations, the method comprising:

asynchronously triggering execution of a demodulation stage, responsive to reception of a pulse of one of the modulation symbols; and executing the demodulation stage to generate demodulated data from the received signal.

14. The method of claim 13, wherein the combination by which each available modulation symbol indicates the information further comprises the position of the pulse, and wherein metrics used by the demodulation stage are based on the position of the pulse.

15. The method of claim 13, wherein the position of the pulse is determined in relation to an end of a previous pulse.

16. The method of claim 15 further comprising, responsive to absence of pulse reception for a maximum integer multiple of pulse duration intervals after the end of the previous pulse, triggering execution of a dummy demodulation stage.

17. The method of claim 16 further comprising, responsive to reception of a first pulse after the dummy modulation stage, disregarding any information carried by the position of the first pulse.

18. An apparatus for providing a modulated signal for transmission, the apparatus comprising:

controlling circuitry;

memory coupled with the controlling circuitry, wherein the memory includes instructions that when executed by the controlling circuitry cause the apparatus to perform operations comprising:

setting a reference point in time for a current block of information to be modulated, wherein the reference point in time is related to an end of a pulse of a previous modulation symbol;

selecting a modulation symbol from a collection of available modulation symbols for representation of the current block of information to be modulated, wherein each available modulation symbol has a symbol duration, comprises a pulse, and indicates the information by a combination of an amplitude of the pulse and a carrier phase of the pulse, wherein a position of the pulse is defined within the symbol duration of the available modulation symbol, and wherein at least two of the available modulation symbols have different symbol durations, wherein the selection of the modulation symbol for representation of the current block of information to be modulated comprises specifying the position of the pulse in relation to the reference point in time for the current block of information; and operating a signal generator to provide the selected modulation symbol for transmission.

* * * * *